US008658917B2

(12) United States Patent
Westhues

(10) Patent No.: US 8,658,917 B2
(45) Date of Patent: Feb. 25, 2014

(54) TECHNIQUES FOR DISAMBIGUATING TOUCH DATA USING USER DEVICES

(75) Inventor: Jonathan Westhues, New York, NY (US)

(73) Assignee: Perceptive Pixel Inc., New York, NY (US)

( * ) Notice: Subject to any disclaimer, the term of this patent is extended or adjusted under 35 U.S.C. 154(b) by 348 days.

(21) Appl. No.: 13/021,335

(22) Filed: Feb. 4, 2011

(65) Prior Publication Data

US 2012/0200523 A1    Aug. 9, 2012

(51) Int. Cl.
*G06F 3/044*    (2006.01)

(52) U.S. Cl.
USPC .................. 178/18.06; 178/18.03; 345/173

(58) Field of Classification Search
USPC .................. 345/156–184; 178/18.01–20.04
See application file for complete search history.

(56) References Cited

U.S. PATENT DOCUMENTS

| | | | |
|---|---|---|---|
| 4,672,154 A | 6/1987 | Rodgers et al. | |
| 5,606,346 A | 2/1997 | Kai et al. | |
| 6,002,389 A | 12/1999 | Kasser | |
| 7,453,444 B2 * | 11/2008 | Geaghan | 345/173 |
| 7,535,481 B2 | 5/2009 | Dehlin | |
| RE41,731 E * | 9/2010 | Dietz et al. | 343/893 |
| 8,125,459 B2 * | 2/2012 | Mattice et al. | 345/173 |
| 8,159,472 B2 * | 4/2012 | Geaghan | 345/174 |
| 2002/0185981 A1 | 12/2002 | Dietz et al. | |
| 2002/0185999 A1 | 12/2002 | Tajima et al. | |
| 2003/0063073 A1 | 4/2003 | Geaghan et al. | |
| 2003/0067447 A1 * | 4/2003 | Geaghan et al. | 345/173 |
| 2006/0007124 A1 | 1/2006 | Dehlin | |
| 2006/0022959 A1 * | 2/2006 | Geaghan | 345/173 |
| 2006/0161870 A1 | 7/2006 | Hotelling et al. | |
| 2006/0161871 A1 | 7/2006 | Hotelling et al. | |
| 2007/0273670 A1 * | 11/2007 | Nordahl | 345/173 |
| 2008/0158185 A1 * | 7/2008 | Westerman | 345/173 |
| 2009/0009483 A1 | 1/2009 | Hotelling et al. | |
| 2009/0040193 A1 * | 2/2009 | Geaghan | 345/173 |
| 2009/0085881 A1 * | 4/2009 | Keam | 345/173 |
| 2009/0127005 A1 | 5/2009 | Zachut et al. | |
| 2009/0135148 A1 | 5/2009 | Bytheway | |
| 2009/0211817 A1 * | 8/2009 | Chang et al. | 178/18.01 |
| 2009/0225036 A1 * | 9/2009 | Wright | 345/173 |
| 2009/0244029 A1 | 10/2009 | Huang et al. | |
| 2009/0284495 A1 | 11/2009 | Geaghan et al. | |

(Continued)

FOREIGN PATENT DOCUMENTS

| | | |
|---|---|---|
| EP | 1956469 A2 | 8/2008 |
| EP | 2024974 A2 | 4/2009 |
| GB | 2428094 A | 1/2007 |
| WO | WO9718528 A1 | 5/1997 |

OTHER PUBLICATIONS

Uchimura et al., "Oversampling A-to-D and D-to A Converters with Multistage Noise Shaping Modulators," IEEE Transactions on Acoustics, Speech, and Signal Processing, vol. 36, No. 12, Dec. 1, 1988, 10 pages.

(Continued)

*Primary Examiner* — Dmitriy Bolotin
(74) *Attorney, Agent, or Firm* — Glen Johnson; Micky Minhas

(57) ABSTRACT

Techniques for disambiguating touch data and determining user assignment of touch points detected by a touch sensor are described. The techniques leverage both user-specific touch data projected onto axes and non-user-specific touch data captured over a complete area.

32 Claims, 18 Drawing Sheets

(56) References Cited

U.S. PATENT DOCUMENTS

| | | | |
|---|---|---|---|
| 2010/0026664 A1 | 2/2010 | Geaghan | |
| 2010/0060593 A1 | 3/2010 | Krah | |
| 2010/0073325 A1 | 3/2010 | Yang | |
| 2010/0085326 A1 | 4/2010 | Anno | |
| 2010/0097342 A1* | 4/2010 | Simmons et al. | 345/174 |
| 2010/0107099 A1 | 4/2010 | Frazier et al. | |
| 2010/0144391 A1 | 6/2010 | Chang et al. | |
| 2010/0156805 A1 | 6/2010 | Brand et al. | |
| 2010/0193258 A1* | 8/2010 | Simmons et al. | 178/18.06 |
| 2010/0300773 A1* | 12/2010 | Cordeiro et al. | 178/18.06 |

OTHER PUBLICATIONS

Notification of Transmittal of International Search Report and the Written Opinion of the International Searching Authority, or the Declaration dated Jan. 6, 2012 from International Application No. PCT/US2011/043935, 13 pages.

Notification of Transmittal of International Search Report and the Written Opinion of the International Searching Authority, or the Declaration dated Dec. 21, 2011 from International Application No. PCT/US2011/043936, 16 pages.

Invitation to Pay Additional Fees and, where Applicable, Protest Fee, including Communication Relating to the Results of the Partial International Search dated Dec. 20, 2011 from International Application No. PCT/US2011/043937, 9 pages.

Invitation to Pay Additional Fees and, where Applicable, Protest Fee, including Communication Relating to the Results of the Partial International Search dated Dec. 22, 2011 from International Application No. PCT/US2011/047844. 9 pages.

Notification of Transmittal of International Search Report and the Written Opinion of the International Searching Authority, or the Declaration dated Mar. 6, 2012 from International Application No. PCT/2011/043937, 19 pages.

Notification of Transmittal of International Search Report and the Written Opinion of the International Searching Authority, or the Declaration dated Mar. 6, 2012 from International Application No. PCT/2011/047844, 24 pages.

Notification of Transmittal of International Search Report and the Written Opinion of the International Searching Authority, or the Declaration dated May 15, 2012 from International Application No. PCT/2012/023915, 15 pages.

DiamondTouch by Circle Twelve, downloaded from the internet on Aug. 27, 2010, at http://circletwelve.com/products/howitworks.html , 2 pages.

* cited by examiner

TECHNIQUES FOR DISAMBIGUATING TOUCH DATA USING USER DEVICES

TECHNICAL FIELD

This disclosure relates to techniques for disambiguating touch data yielded from touch sensors.

BACKGROUND

Touch-sensitive systems detect and respond to one or more points of contact on a surface. A touch-sensitive system may be incorporated within an electronic device in the form of a touch screen display that allows a user to both view and manipulate objects using one or more inputs that contact the screen.

SUMMARY

Techniques are described for disambiguating touch data yielded from touch sensors.

In one aspect, a technique for detecting touch and disambiguating touch data using a capacitive touch sensor system is described. The capacitive touch sensor system includes a capacitive touch sensor having a two-dimensional matrix of conductors configured as a first array of conductors arranged in rows and a second array of conductors arranged in columns. The capacitive touch sensor system further includes a first user device that is associated with a first user and that includes first active components and a first electrode configured to both transmit and receive signals, and a second user device that is associated with a second user and that includes second active components and a second electrode configured to both transmit and receive signals. At least one first signal is received in the first user device from one or more columns in the matrix. A signal strength of the at least one first signal received by the first user device is measured. The measured first signal strengths are used to generate column touch data for the first user. The first user column touch data indicate one or more columns in the matrix that are touched by the first user. The first user column touch data are transmitted. A second signal is transmitted from the first electrode of the first user device to one or more rows in the matrix. The capacitive touch sensor is configured to generate row touch data for the first user based on the received second signal. The first user row touch data indicate one or more rows in the matrix that are touched by the first user. The first electrode is located within the first user device and is configured to electrostatically couple with the capacitive touch sensor through a body of the first user. At least one third signal is received in the second user device from one or more of the columns in the matrix, and a signal strength of the at least one third signal received by the second user device is measured. The measured third signal strengths are used to generate column touch data for the second user. The second user column touch data indicate one or more columns in the matrix that are touched by the second user. The second user column touch data are transmitted. A fourth signal is transmitted from the second electrode of the second user device to one or more rows in the matrix. The capacitive touch sensor is configured to generate row touch data for the second user based on the received fourth signal. The second user row touch data indicate one or more rows in the matrix that are touched by the second user, and the second electrode is located within the second user device and is configured to electrostatically couple with the capacitive touch sensor through a body of the second user. Fifth signals are received in the rows of the matrix from the columns of the matrix, and a signal strength of each fifth signal received by the rows from the columns is measured. The measured fifth signal strengths are used to generate touch point location data that indicate two-dimensional locations of multiple touch points on the matrix, the touch point location data indicating the two-dimensional location of each of the multiple touch points as a pairing of a row of the matrix and a column of the matrix. At least one touch point of the multiple touch points is identified as corresponding to a touch made by the first user by applying the generated touch point location data to the generated first user row touch data, the generated first user column touch data, the generated second user row touch data and the generated second user column touch data, and the identification is transmitted.

Implementations may include one or more of the following features. For example, receiving the at least one first signal in the first user device may include receiving the at least one first signal at the first electrode of the first user device through the body of the first user when the first user is touching the matrix with at least one finger, and the column touch data for the first user may indicate columns touched by the at least one finger of the first user. Transmitting the at least one second signal from the first electrode of the first user device may include transmitting the at least one second signal through the body of the first user when the first user is touching the matrix with at least one finger, and the row touch data for the first user may indicate rows touched by the at least one finger of the first user.

Receiving the at least one first signal in the first user device may include receiving the at least one first signal in a portable device configured to be physically carried by the first user. Receiving the at least one first signal in the first user device may include receiving the at least one first signal in a coat that includes an outer lining of conductive material that acts as a grounding plate and an inner lining of conductive material that acts as the first electrode. Receiving the at least one first signal in the first user device may include receiving the at least one first signal in a shoe that includes an inner plate configured to contact a foot of the first user, the inner plate acting as the first electrode, and also includes an outer plate configured to couple to a floor on which the first user is standing, the outer plate acting as a grounding plate.

Receiving the at least one first signal in the first user device may include receiving the at least one first signal in a wireless device, and transmitting the column touch data for the first user may include wirelessly transmitting the column touch data for the first user to a remote computer from the wireless device. Receiving the at least one first signal in the first user device may include receiving the at least one first signal in a wired device, and transmitting the first user column touch data may include transmitting the first user column touch data to a remote computer over a wire from the wired device.

The capacitive touch sensor may include a controller circuit, and receiving the at least one first signal in the first user device may include receiving the at least one first signal in a device that includes a grounding plate carried by the first user that is configured to capacitively couple to a ground of the controller circuit. Receiving the at least one first signal in the first user device may include receiving the at least one first signal in a device that is configured to be directly connected to a ground of the controller circuit by a wire.

In some implementations, the first active components and the second active components correspond to a same circuit. Receiving the at least one first signal in the first user device may include receiving the at least one first signal in a device that may include a switch, a receiver circuit, a transmitter circuit, a microcontroller and an internal power source. The switch may be coupled with the first electrode and may be configured for multiplexing a relatively large voltage and a relatively small current. The switch may be configured for transmitting a voltage onto the first electrode in a transmission mode, and for receiving a current from the first electrode in a receiving mode. The receiver circuit for the current may be coupled to the switch to receive at least part of the current through the switch, from the first electrode. The transmitter circuit for the voltage may be coupled to the switch to transmit at least part of the voltage through the switch, onto the first electrode. The microcontroller may be coupled to the receiver and the transmitter circuits, and the internal power source may be configured to provide power to at least the microcontroller.

The microcontroller may generate the first user column touch data and report at least some of the first user column touch data from the first user device. Transmitting the first user column touch data may include the transmitter transmitting the first user column touch data over a wireless, an ultrasonic channel or an optical channel. Receiving the at least one first signal in the first user device may include receiving the at least one first signal in a device that includes a battery or a supercapacitor as the internal power source. Receiving the at least one first signal in the first user device may include receiving the at least one first signal in the device that includes the switch coupled with the first electrode that is configured for multiplexing a voltage on the order of one hundred volts and a current on the order of one microamp.

In another aspect, a technique for using user devices to capture touch data for multiple users touching a capacitive touch sensor is described. The capacitive touch sensor includes a two-dimensional matrix of conductors configured as a first array of conductors arranged in rows and a second array of conductors arranged in columns. Each of the multiple users is associated with a different user device that includes an electrode and active components. A first column of the matrix is energized, and a first signal in each row of the matrix is received as a result of the energizing of the first column. A signal strength of each first signal received in each row of the matrix is measured. The measured first signal strengths are used to identify locations of touch points on the first column, and touch point location data is updated to indicate the locations of touch points on the first column. At each of the multiple user devices, a detection is made whether the energizing of the first column results in a particular signal change at the user device, and, based on whether the energizing of the first column results in the particular signal change at the user device, column touch data for the user associated with the user device is updated to indicate that the first column is touched by the user associated with the user device. Based on whether the energizing of the first column does not result in the particular signal change at the user device, the column touch data for the user associated with the user device is not updated to indicate that the first column is touched by the user associated with the user device.

Implementations may include one or more of the following features. For example, each of the multiple users being associated with a different user device may include each of the multiple users physically carrying a different user device. The capacitive touch sensor may include a controller circuit and energizing the first column may include applying a time-varying voltage between the first column and a ground of the controller circuit. Detecting whether the energizing of the first column results in a particular signal change at the user device may include measuring a current at the user device that is indicative of a capacitance from the first column to a body of the user associated with the user device, and comparing results of the measurement to a baseline.

The energizing of the first column of the matrix may occur in a single time slot of a frame, the single time slot being allocated to the first column. The technique may further include sequentially energizing each remaining column of the matrix in sequential time slots in the frame to thereby update the touch point location data to indicate two dimensional locations of all touch points on the matrix, and to thereby update the column touch data for the multiple users to indicate a set of columns touched by each of the multiple users.

In some implementations, the technique may further include energizing a selected user device of a selected one of the multiple users, and, at each row of the matrix, detecting whether the energizing of the selected user device results in a particular signal change at the row. Based on whether the energizing of the selected user device results in the particular signal change at the row, row touch data for the selected user may be updated to indicate that the row is touched by the selected user, and based on whether the energizing of the selected user device does not result in the particular signal change at the row, the row touch data for the selected user may not be updated to indicate that the row is touched by the selected user. Energizing the selected user device may include transmitting a time-varying voltage through the electrode of the selected user device. In these implementations, detecting whether the energizing of the selected user device results in a particular signal change at the row may include measuring a current at the row that is indicative of a capacitance from the row to a body of the selected user, and comparing results of the measurement to a baseline. The energizing of the first column of the matrix may occur in a first time slot of a frame, the first time slot being allocated to the first column, and the energizing of the selected user device of the selected user may occur in a second and different time slot of the frame, the second time slot being allocated to the selected user device.

Each remaining user device of the multiple users may be sequentially energized in sequential time slots in the frame to thereby update the row touch data for each of the multiple users to indicate a set of rows touched by each user. The frame may include a time slot allocated to each of the columns of the matrix, and a time slot allocated to each of the multiple user devices, and each remaining column of the matrix may be sequentially energized during its allocated time slot in the frame to thereby update the touch point location data to indicate two dimensional locations of all touch points on the matrix, and to thereby update the column touch data for the multiple users to indicate a set of columns touched by each user. Each remaining user device of the multiple users may be sequentially energized in its allocated time slot in the frame to thereby update the row touch data for each of the multiple users to indicate a set of rows touched by each user.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
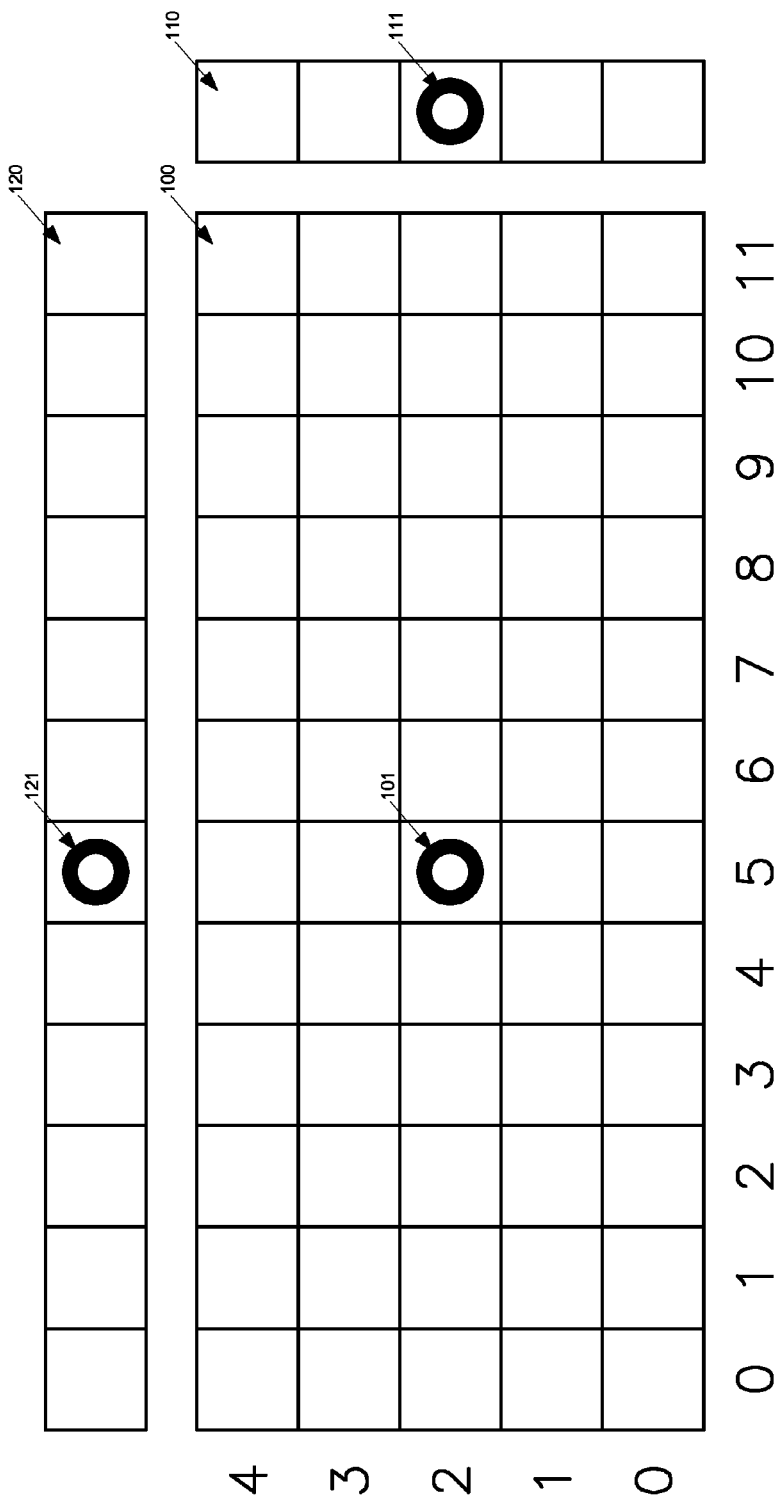
FIGS. 1 and 2 are each a diagram illustrating a touch sensor grid, m*n touch data, and m+n touch data.

A capacitive touch sensor may include conducting rows and columns, arranged in a two-dimensional grid. The specific geometry of the row and column conductors may vary according to the conducting material used to realize them. For example, the rows and columns may be arranged in a diamond pattern, with indium tin oxide as the conducting material; or the rows and columns may be formed using metal wires (e.g., copper or silver wires) sufficiently thin to be inconspicuous when the touch sensor is placed in front of a display. Regardless of the specific geometry of the conductors, the sensor may sense touch in one of the following two ways: (1) by measuring the capacitance from each row to each column; or (2) by measuring the capacitance from each row and each column to some other node, where the other node is frequently though not necessarily the controller circuit's ground node. In either case, the sensor may be designed so that a touch by, for example, the user's finger has some effect on the capacitance under test, and is thereby detected. In a sensor with m rows and n columns, m*n possible capacitances exist from a row to a column, and m+n possible capacitances exist from a row or a column to some other node (i.e., m capacitances exist for the rows and n capacitances exist for the columns, resulting in a total of m+n possible capacitances). The measurement data obtained by measuring capacitance from each row to each column of the m by n grid of the touch sensor are hereinafter referred to as m*n touch data or as all-users m*n touch data, and the measurement data obtained by measuring the capacitance from each row and each column of the m by n grid to some other node are hereinafter referred to as m+n touch data. Typically, the m*n touch data and the m+n touch data do not distinguish between touches from different users simultaneously touching the touch sensor. Moreover and as further discussed below, the m+n touch data alone may not be able to unambiguously resolve the locations of all touch points on the grid of the touch sensor. Heuristic methods may be used to assign different touches to different users and to address the ambiguity in the m+n touch data, but when used alone, such methods are subject to increasing errors as the number of touches increases. As described in further detail below, however, a touch sensor able to measure both m*n touch data and user-specific m+n touch data may be able to disambiguate m+n touch data and to assign different detected touches to different users with greater accuracy than may be possible using only heuristics or other alternative methods.

As stated above, m*n touch data are obtained by making measurements of a capacitance from each row to each column of the m by n grid (which corresponds to m*n measurements). By making these measurements, any combination of multiple touches may be resolved. The m*n measurements form a bitmap image of the display, with increases or decreases in the capacitance at a given point (compared to the baseline capacitance at that point) corresponding to a touch. The m*n touch data, therefore, also may be referenced as touch data over a complete area. A touch sensor configured to capture m*n touch data will, therefore, typically be able to correctly determine the location of touch points, regardless of the number of simultaneous touch points.

In contrast, when a touch sensor is only configured to capture m+n touch data by measuring capacitance from each row and each column of the m by n grid to some other node (which corresponds to m+n measurements), fewer degrees of freedom are available. Because the m+n touch data may be viewed as touch points projected onto the x or y axis of the grid, the m+n touch data is sometimes referred to as touch data projected onto axes. Just by a counting argument, reconstructing the full bitmap image (i.e., touch data over a complete area) using only these m+n measurements may be difficult. As described in further detail below, however, with a single touch, the location of that touch may still be resolved unambiguously.

FIG. 1 is a diagram illustrating an example touch sensor grid 100 and corresponding row touch data 110 and column touch data 120. Notably, the designation of one particular axis as the rows vs. columns is arbitrary. Grid 100 has 5 rows numerically labeled from 0 to 4 and 12 columns numerically labeled from 0 to 11. While grid 100 is shown to only have 5 rows and 12 columns, the number of rows and columns may vary. For example, a touch sensor grid of a typical touch sensor may have hundreds of rows and columns. A position of a touch on the grid 100 may be represented by a touch point having an x-coordinate that reflects the column number and a y-coordinate that reflects the row number. FIG. 1 shows a single touch point 101 at position (x,y)=(5, 2) that represents a touch at this location on the grid 100. The touch produces a signal at position 5 in the measurement of capacitance from each column to some other node, and a signal at position 2 in the measurement of capacitance from each row to some other node. The corresponding column touch data produced by the touch sensor in response to the touch is illustrated in FIG. 1 as including a column touch 121 at column 5 and a row touch 111 at row 2.

For a single touch, it is possible to unambiguously determine a location of the corresponding touch point on the grid 100 using only the m+n measurements. That is, it is possible to unambiguously determine the corresponding touch point's location using only the row touch data 110, which represents the measurements of capacitance from a row to another node for each of the five rows of the grid 100, and using only the column touch data 120, which represents the measurements of capacitance from a column to another node for each of the twelve columns of the grid 100. With multiple touches, however, resolving the position of a touch point unambiguously may no longer be possible using only the m+n measurements.

Figure 2:
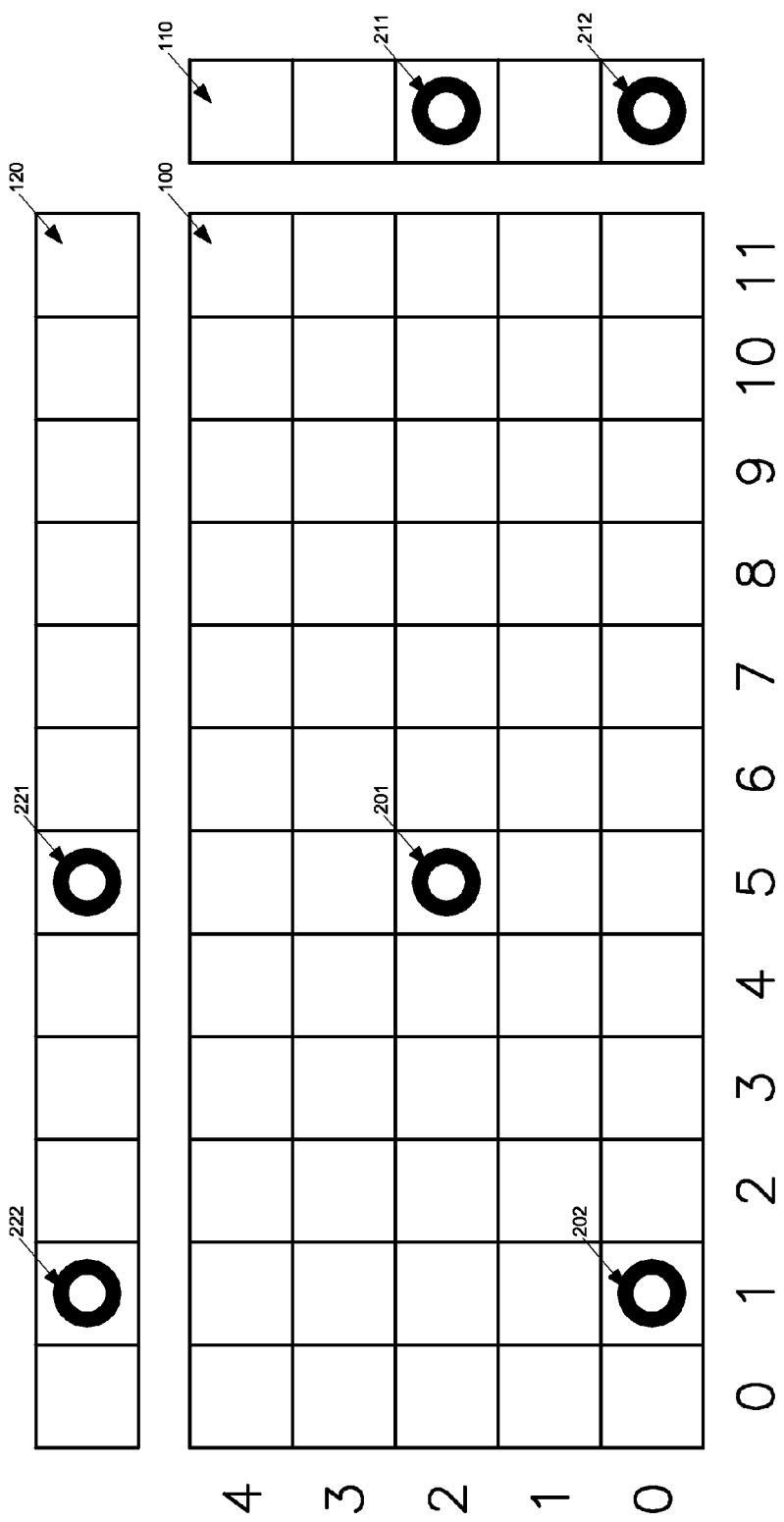

For example, in FIG. 2, two touches are present on the grid 100. The first touch is represented by touch point 201 at location (x,y)=(5, 2), and the second touch is represented by touch point 202 at location (x,y)=(1,0). This produces a variation in the columns signal, at positions 1 and 5, and in the rows signal, at positions 0 and 2. Accordingly, the corresponding column touch data 120 includes a column touch 222 at column 1 and a column touch 221 at column 5, and the corresponding row touch data 110 includes a row touch 212 at row 0 and a row touch 211 at row 2.

Notably, the m+n touch data shown in FIG. 2 are ambiguous in that it is not possible to unambiguously map the data onto the locations of the two touch points 201 and 202. That is, the exact same configuration of capacitances along the rows and columns would be generated by touch points at (1, 2) and (5,0). Heuristic methods may be used to disambiguate the m+n touch data, for example based on the history of the touch points. Such heuristic methods that leverage the history of the touch points may, for example, determine that if the m+n touch data changes from data indicating that only column $\{5\}$ and row $\{2\}$ were touched to data indicating that columns $\{1,5\}$ and rows $\{0,2\}$ were touched, it is more likely that the touch point at (5, 2) remained and a point at (1,0) was added, than that the touch point at (5, 2) was lifted and two points at (1, 2) and (5,0) were added. Heuristic methods that operate in this manner, however, may fail for configurations over time that have two or more touch points. Specifically, as the number of touch points increases, the number of possible solutions for a given configuration may increase, and an incorrect result may become more likely.

I. Using M*N Touch Data and User-Specific M+N Touch Data to Disambiguate Touch Data and To Determine User Assignment of Touch Points If only m+n touch data are available, then the heuristic methods described above may be the best solution available. But if m*n touch data are also available, then the m*n touch data may be used to disambiguate the m+n touch data. For example, in the case depicted by FIG. 2, the solution with points at (1, 2) and (5,0) could be rejected, since the m*n touch data do not indicate a touch at position (1, 2).

For the cases described so far, this may not be useful. That is, if the m*n touch data are available, then it would be preferable to identify the touch points working directly from the m*n touch data, making the acquisition and use of m+n touch data for touch point identification superfluous and unnecessary. In certain situations, however, it is possible to measure m+n touch data independently for each user but only measure m*n touch data for all the users simultaneously. For example, a point touched by User A appears in User A's m+n touch data, does not appear in User B's m+n touch data, and does appear in the m*n data, and a point touched by User B appears in User B's m+n touch data, does not appear in User A's m+n touch data, and does appear in the m*n data.

If we wish to determine not just the locations of the touch points, but also the identity of the corresponding user touching the touch sensor, then m+n touch data, while not as useful for touch point identification as m*n touch data, remains useful for assigning touch points to different users. Notably, for the m+n touch data to be leveraged in this manner, the m+n touch data should typically be user-specific. That is, the touch sensor system may capture different m+n touch data for each user touching the sensor.

Figure 3:
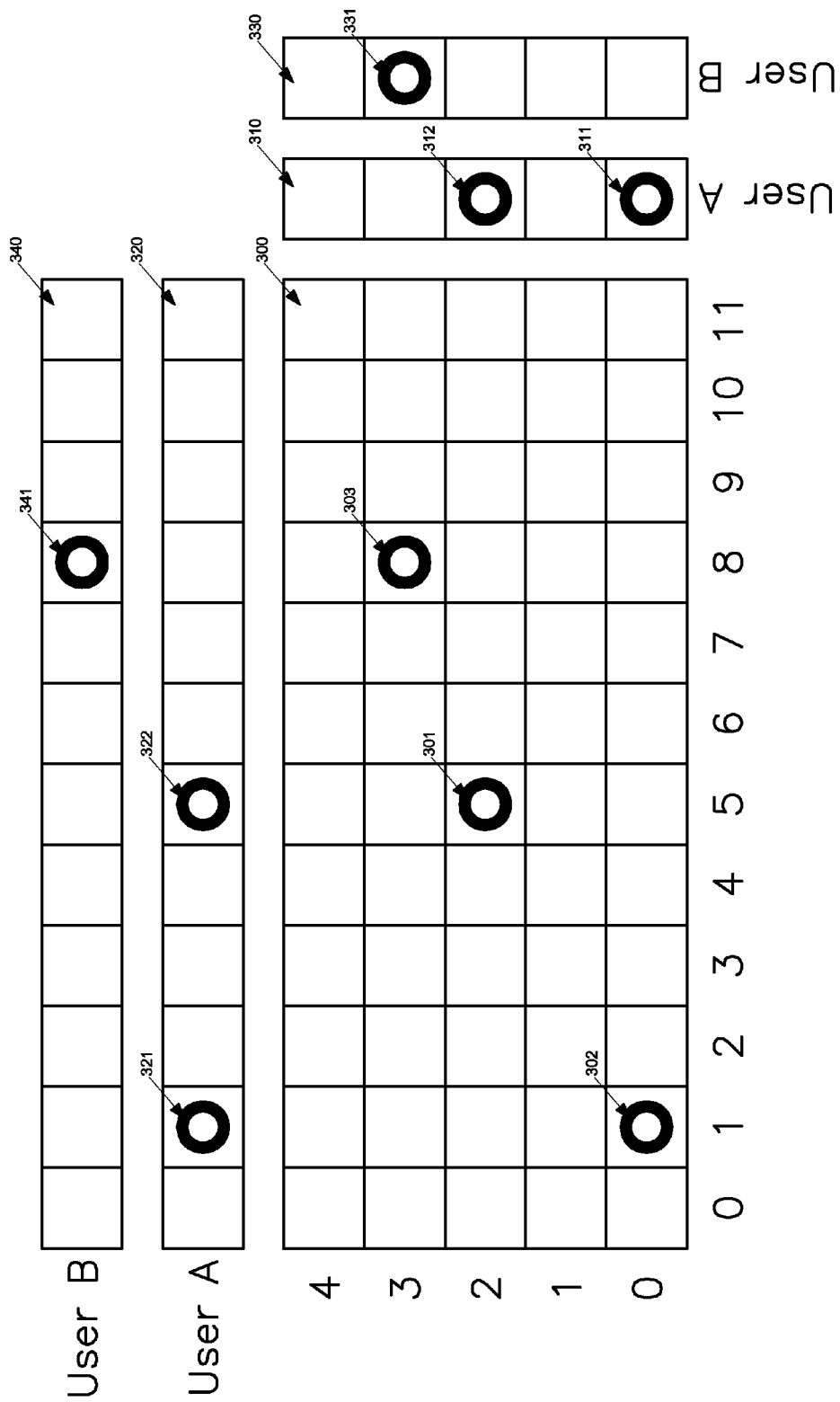
FIGS. 3 and 4 are each a diagram illustrating a touch sensor grid, m*n touch data and user-specific m+n touch data.

FIG. 3 is a diagram illustrating an example touch sensor grid 300 and corresponding row touch data 310 and column touch data 320 for a first user (i.e., User A), and corresponding row touch data 330 and column touch data 340 for a second user (i.e., User B). Grid 300 corresponds to and is an exemplary implementation of grid 100 of FIG. 1. Row touch data 310 and column touch data 320 together represent the m+n touch data for User A, and row touch data 330 and column touch data 340 together represent the m+n touch data for User B.

As shown in FIG. 3, the column touch data 320 includes a column touch 321 and a column touch 322 that indicate that User A is touching columns $\{1,5\}$, and the row touch data 310 includes a row touch 311 and a row touch 312 that indicates that User A is touching rows $\{0,2\}$. Accordingly, when considering possible touch point locations based only on the m+n touch data of User A, User A might be touching at (5, 2) and (1,0), or (1, 2) and (5,0), or at any three of those points, or at all four. The m*n touch data, however, may be used to narrow down (i.e., disambiguate) the possible touch point locations and, in this particular example, to definitively conclude that User A is touching at (5,2) and at (1,0), represented by touch point 301 and touch point 302, respectively. Specifically, since the m*n touch data do not contain a point at either (1, 2) or (5,0), those two points can be rejected, leaving only the correct solution of (5, 2) and (1,0).

As also shown FIG. 3, the column touch data 340 of User B includes a column touch 341 that indicates that User B is touching column $\{8\}$, and the row touch data 330 of User B includes a row touch 331 that indicates that User B is touching row $\{3\}$. Thus, the m+n touch data of User B unambiguously indicates that User B is touching at point (8, 3), represented by touch point 303. Accordingly, by using both the user-specific m+n touch data and the all-users m*n touch data, the location of each touch point is resolved unambiguously (which would have been impossible without the m*n touch data), and the identity of the user corresponding to each touch point is determined (which would have been impossible without the user-specific m+n touch data).

For any case of a single user touching multiple points, or of multiple users each touching only a single point, a method similar to the reasoning above will locate and assign a user identity to each touch point, without ambiguity. But configurations with multiple users, each touching at multiple points, may be ambiguous.

Figure 4:
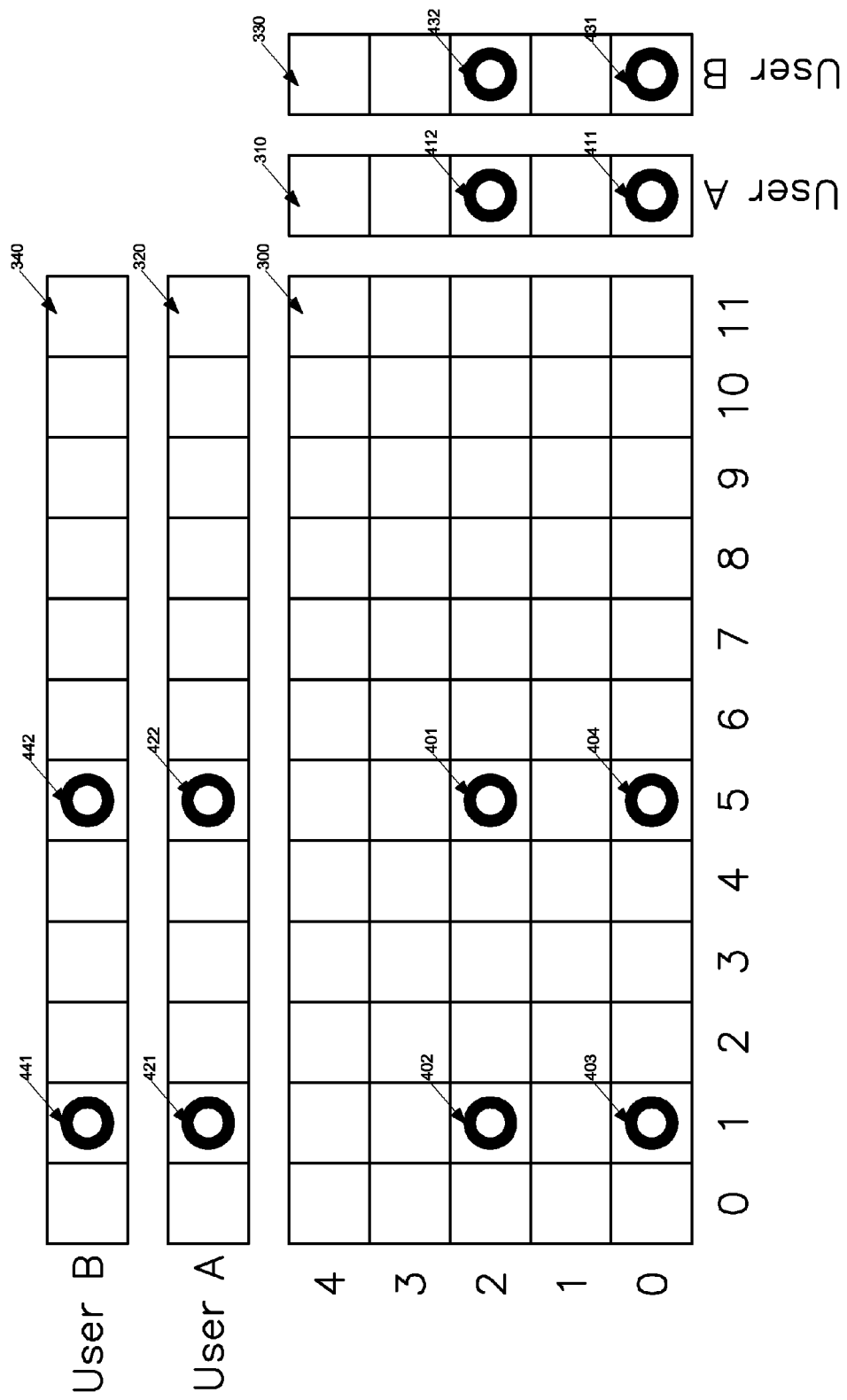

For example, in FIG. 4, the row touch data 310 for User A and the row touch data 330 for User B include row touches 411, 412, 431 and 432 that indicate that both users are touching at rows $\{0,2\}$. Similarly, the column touch data 320 for User A and the column touch data 340 for User B include column touches 421, 422, 441 and 442 that indicate that both users are touching columns $\{1,5\}$. The m+n touch data, therefore, indicate that either user might be touching at (5, 2) and (1,0), or (1, 2) and (5,0). But the m*n data contain points at all of those locations (i.e., touch points 401-404). Therefore, it may not be possible to determine whether User A is touching at (5, 2) and (1,0) and User B at (1, 2) and (5,0), or whether User B is touching at (5, 2) and (1,0) and User A at (1, 2) and (5,0). This ambiguity may be resolved using the same types of heuristics as are used to resolve ambiguities when working from m+n touch data only. For example, this ambiguity may be resolved by choosing the solution that minimizes the change in the touch points' position (and possibly other values, for example velocity) over time.

A complete algorithm to determine the location and user identity corresponding to each touch point may start from each user's m+n touch data, and map those values onto touch points while resolving any ambiguities with the m*n touch data. Or, the algorithm may start with the all-users m*n touch data, and attempt to identify the user corresponding to each point. In practical implementations, the latter approach is preferred, since the m*n touch data will typically contain less noise. This will decrease the noise on the reported (x,y) position of the touch point, and decrease the probability that a touch will be reported when none occurred, or that a valid touch will be ignored.

Figure 5:
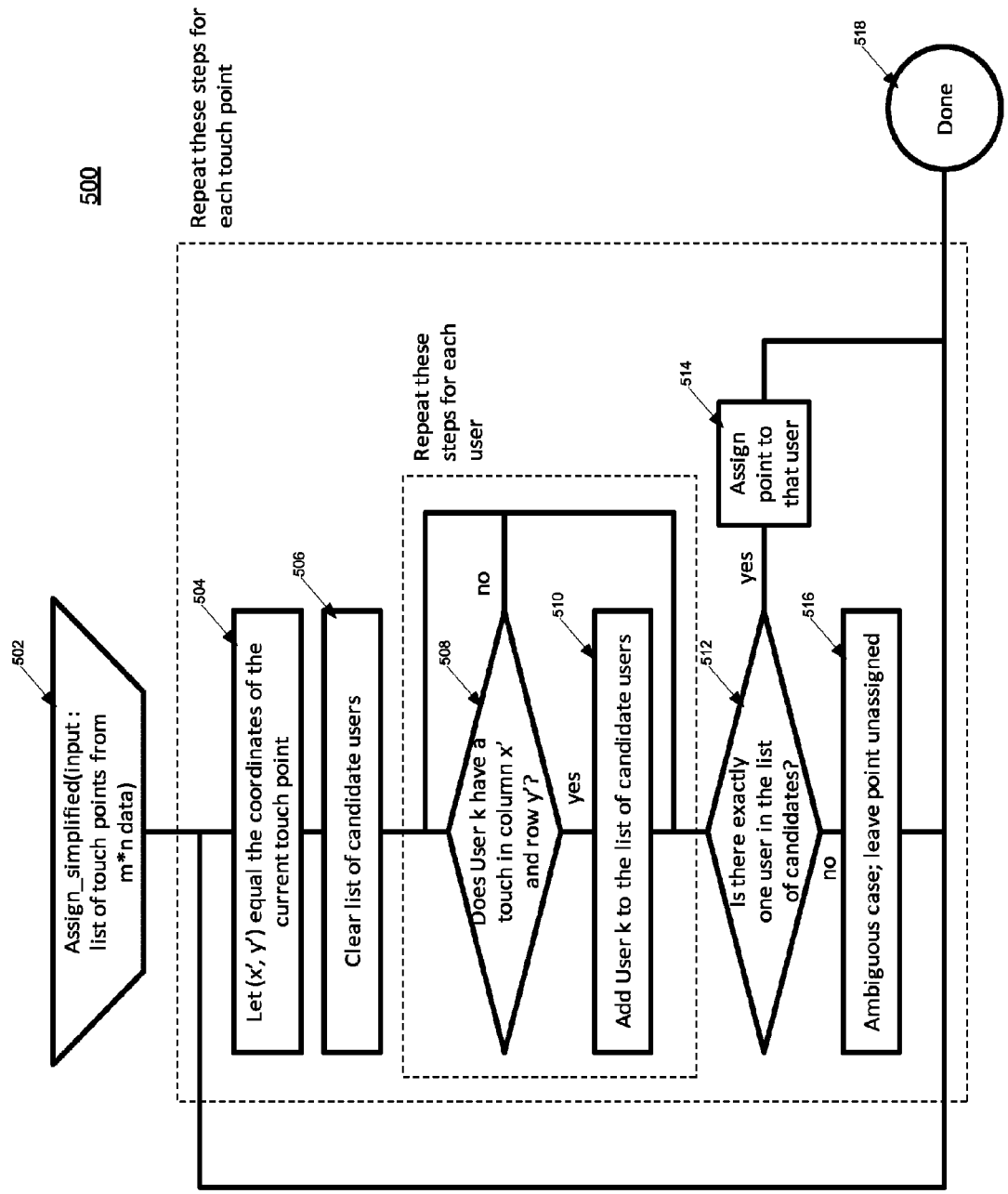
FIG. 5 is a block diagram illustrating a process used to assign touch points to different users based on m*n touch data and user-specific m+n touch data.

FIG. 5 is a block diagram illustrating a process 500 that may be used to assign touch points to different users based on m*n touch data and user-specific m+n touch data. The process 500 represents the following algorithm:

```
for each touch point identified in the m*n data
    clear list of user candidates
    for each user
        if the user's column data show a touch at the touch point's x value
            if the user's row data show a touch at the touch point's y value
                add the user to the list of user candidates
            end
        end
    end
    if the list of user candidates contains zero users
        point was touched by a user for which m+n measurements were not made
    else if the list of user candidates contains one user
        assign touch point to that user
    else
        ambiguous result, to be resolved heuristically
    end
end
```

Referring to FIG. 5, a list of touch points is identified from the m*n data and received as part of a call to the function Assign_simplified (502). A touch point is selected from the list of touch points as the current touch point to be analyzed, the touch point being located at (x', y') (504). A list of candidate users is cleared (506).

After selecting a User K from among multiple users and after accessing the m+n touch data for the User K, the m+n touch data for the User K is used to determine whether the User K has a touch in both the column x' and the row y' (508). If the User K does not have a touch in the column x' and/or does not have a touch in the row y', then a next user is selected from among the multiple users as the User K and the process returns to operation 508. If the User K does have a touch in the column x' and a touch in the row y', then the User K is added to the list of candidate users for the current touch point (510). A next user is then selected from among the multiple users as the User K and the process returns to operation 508. Operations 508 and/or 510 are thereby repeated for each of the multiple users.

Upon completion of operations 508 and/or 510 for each of the multiple users, the list of candidate users for the current touch point is finalized and may include from zero users to all of the users. A determination is made whether the list of candidate users for the current touch point includes only a single user (512). If the list includes only a single user, the current touch point is assigned to the corresponding user (514). If the list includes zero users (which typically indicates that the system is missing m+n touch data for at least one user that touched the touch sensor) or multiple users, then the current touch point is not assigned to a user and is identified as being ambiguous (516). A next touch point is selected from the list of touch points as the current touch point and the process returns to operation 504. After all touch points have been analyzed in this manner, the process 500 terminates (518).

Figure 6:
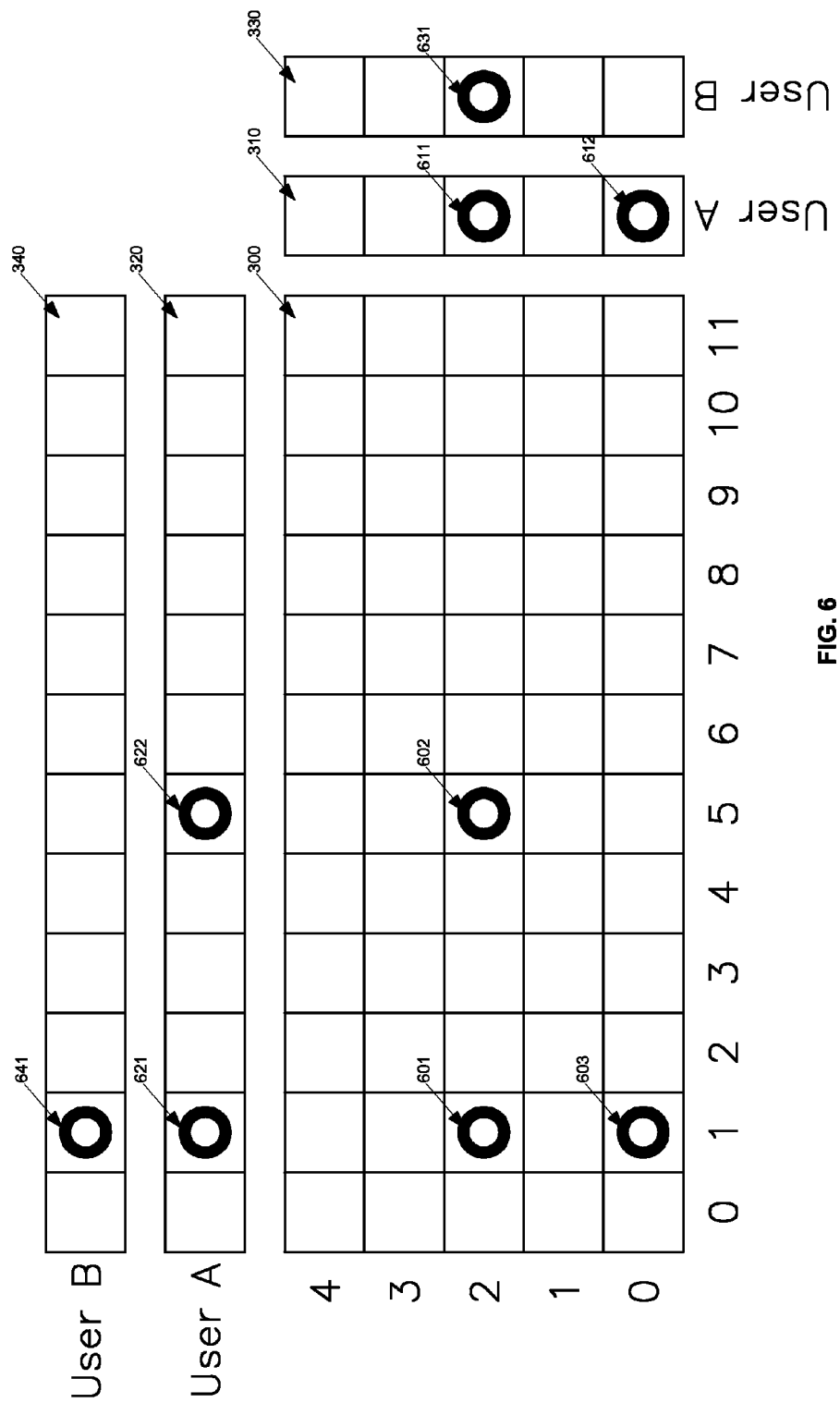
FIGS. 6, 7 and 8 are each a diagram illustrating a touch sensor grid, m*n touch data and user-specific m+n touch data.
Figure 7:
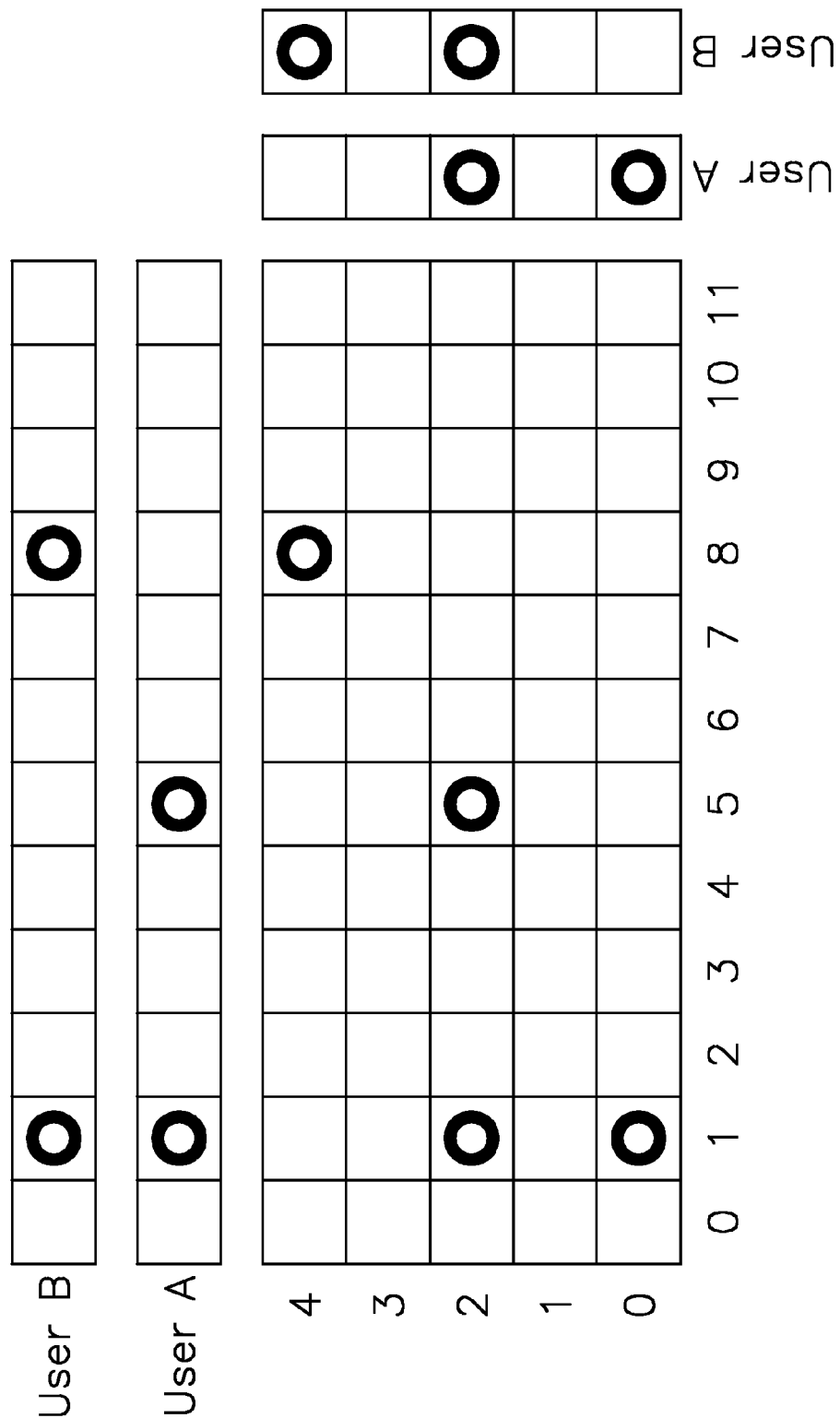

Notably, the algorithm shown above and represented by process 500 incorrectly identifies certain configurations of touch points as ambiguous. For example, in FIG. 6, both User A and User B have m+n touch data consistent with a touch point at (1, 2), represented by touch point 601. That is, the row touch data 310 for User A and the row touch data 330 for User B include row touches 611 and 631 that indicate that both users are touching row {2}. Similarly, the column touch data 320 for user A and the column touch data 340 for User B include column touches 621 and 641 that indicate that both users are touching column {1}. The above algorithm would generate a list of candidate users that includes two users for the touch point 601 at (1, 2) and, therefore, would identify this condition as ambiguous. Notably, however, the m+n touch data for User B indicate that User B is touching at only a single point, so that point must be touch point 601 located at (1, 2), with the other two points 602 and 603 assigned to User A (and corresponding to User A column touches 621 and 622 and User A row touches 611 and 612). A similar situation may occur in configurations with multiple users each touching multiple points, as shown in FIG. 7.

The algorithm represented by process 500 may be improved to better detect ambiguous user assignment configurations. An improved algorithm becomes apparent by recognizing that a particular user assignment solution is valid only if for every x value that appears to be touched in that user's m+n columns touch data, and for every y value that appears to be touched in the user's m+n rows touch data, the user is assigned at least one touch point with that x or y value. Thus, an improved algorithm can test for valid assignment configurations by determining, for each user, whether, for every x value that appears to be touched in the user's m+n columns touch data, and for every y value that appears to be touched in the user's m+n rows touch data, the user is assigned at least one touch point with that x or y value. If the user assignment configuration does not assign at least one touch point with the corresponding x or y value, the user assignment configuration may be discarded as not matching the captured touch data and, therefore, being invalid. Thus, when more than one user appears in the list of candidates for a given touch point through application of process 500, all the possible assignment configurations may be recursively considered, rejecting any solution that does not satisfy the above constraint. In this case, the runtime of an application performing the user assignment processing would increase exponentially with the number of possibly-ambiguous touch points.

Figure 8:
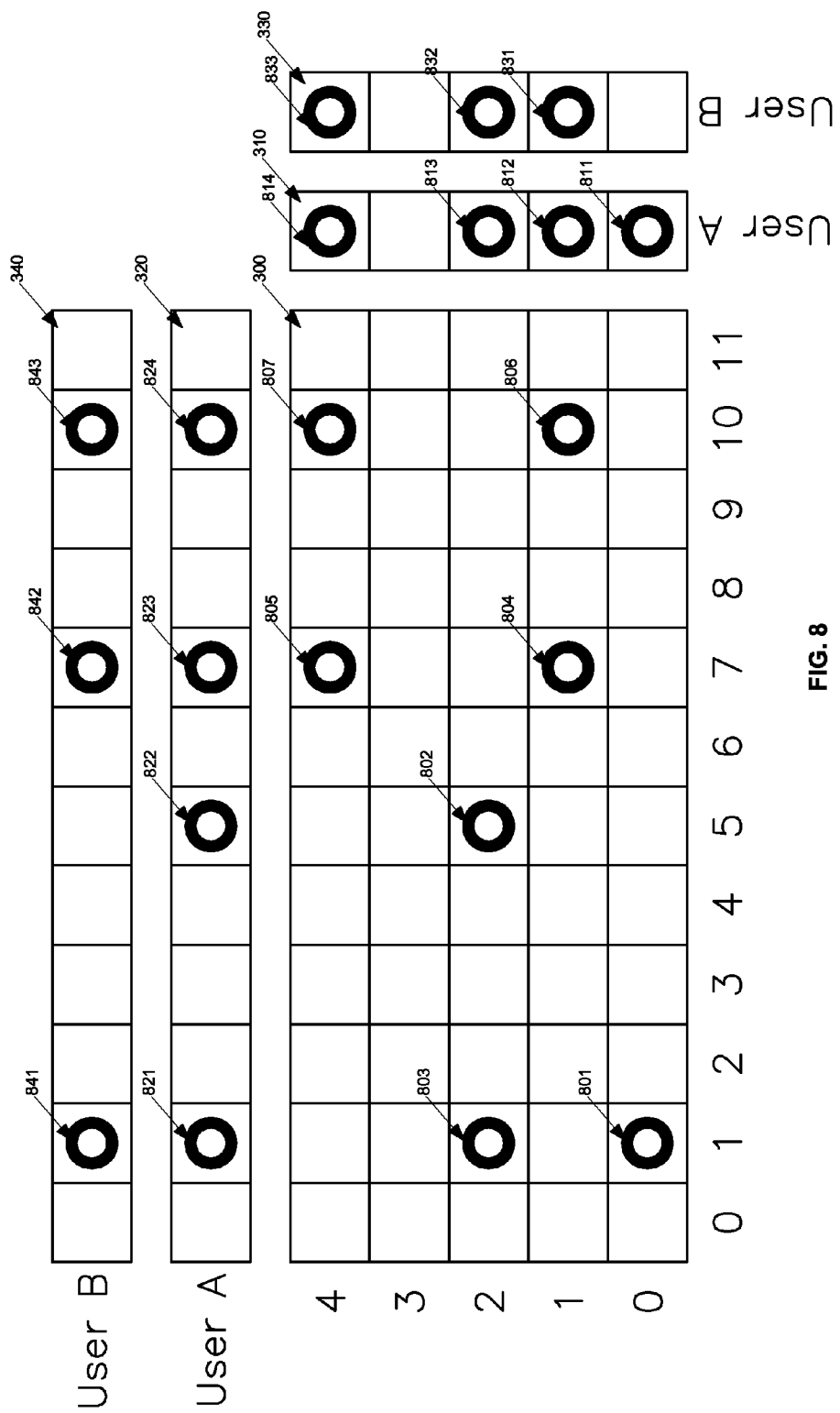

FIG. 8 is a diagram illustrating an example touch sensor grid 300 depicting seven touch points. As shown in FIG. 8, the row touch data 310 of User A include row touches 811, 812, 813 and 814 that indicate that User A is touching rows {0, 1, 2, 4}, and the column touch data 320 of User A include column touches 821, 822, 823 and 824 that indicate that User A is touching columns {1, 5, 7, 10}. The row touch data 330 of User B include row touches 831, 832 and 833 that indicate that User B is touching rows {1, 2, 4}, and the column touch data 340 of User B include column touches 841, 842 and 843 that indicate that User B is touching columns {1, 7, 10}. The m*n touch data indicate detection of seven touch points at {(1,0), (5, 2), (1, 2), (7, 1), (7, 4), (10, 1), (10, 4)}, represented by touch points 801, 802, 803, 804, 805, 806 and 807, respectively.

Without consideration of the user-specific m+n touch data, 128 possible user assignment configurations exist for the seven touch points depicted in FIG. 8. This corresponds to 2^7, where the number two represents the number of users (i.e., two users=User A and User B) and the number seven represents the number of different touch points detected. The number of user assignment configurations, however, can be reduced by taking into account the user-specific m+n touch data through application of the algorithm represented by process 500. Specifically, by applying the algorithm represented by process 500 to the touch data, the touch point (1,0), represented by touch point 801, and the touch point (5,2), represented by touch point 802 are assigned to User A. Thus, application of the algorithm represented by process 500 results in a reduction of the number of possible user assignment configurations from 128 to 32, which corresponds to 2^5 (i.e., number of users ^ number of touch points that remain to be assigned).

Figure 9:
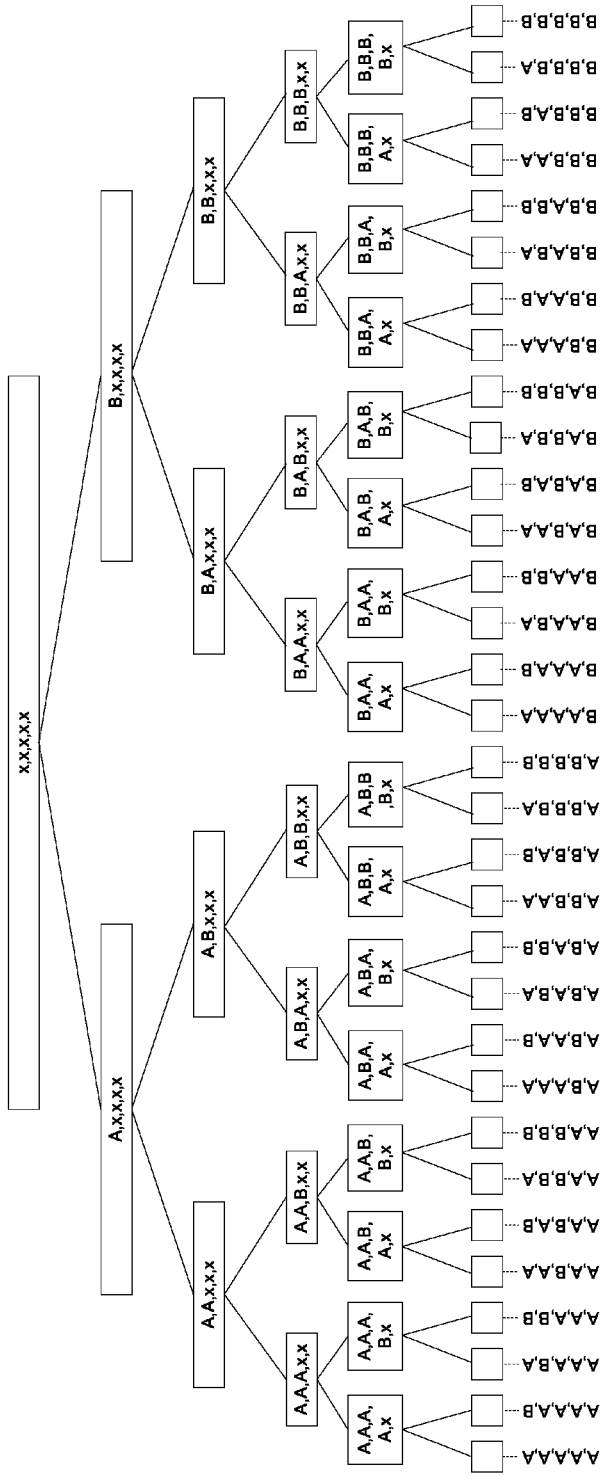
FIG. 9 is a tree diagram illustrating a number of different possible user assignment configurations for a set of detected touch points.

FIG. 9 is a tree diagram that represents the number of different possible user assignment configurations that remain after application of the algorithm represented by process 500. Each block in FIG. 9 shows a given user assignment configuration for the five remaining touch points 803 at (1, 2), 804 at (7, 1), 805 at (7, 4), 806 at (10, 1) and 807 at (10, 4). The user assignment configuration is represented by a set of five letters corresponding to the five touch points that remain to be assigned. Each of the five letters is either an "A" to indicate that the corresponding touch point is assigned to A in the particular user assignment configuration, a "B" to indicate that the corresponding touch point is assigned to B in the particular user assignment configuration, or an "x" to indicate that the corresponding touch point remains unassigned. For example, the five letters "A, B, B, A, x" indicate that touch point 803 at (1, 2) has been assigned to A, touch point 804 at (7, 1) has been assigned to B, touch point 805 at (7, 4) has been assigned to B, touch point 806 at (10, 1) has been assigned to A, and touch point 807 at (10,4) remains unassigned in this particular user assignment configuration.

As shown in FIG. 9, 32 different user assignment configurations are possible that assign all five of the remaining touch points to a combination of Users A and B. The test described above may be applied to each of the 32 possible user assignment configurations to further decrease the number of user assignment configurations that are valid in view of the captured touch data. Specifically, as stated previously, the validity of a particular user assignment configuration can be tested by determining, for each user, whether, for every x value that appears to be touched in the user's m+n columns touch data, and for every y value that appears to be touched in the user's m+n rows touch data, the user is assigned at least one touch point with that x or y value. If the particular user assignment configuration does not assign at least one touch point with the corresponding x or y value, the user assignment configuration may be discarded as not matching the captured touch data and, therefore, being invalid. Application of this test to the 32 possible user assignment configurations further reduces the number of possible user assignment configurations from 32 to 2 valid user assignment configurations. The two valid user assignment configurations (also referred to as valid solutions) identified are: (1) "BABBA" (i.e., User A is assigned touch points {(7, 1), (10, 4)}, and user B is assigned touch points {(1, 2), (7, 4), (10, 1)}); and (2) "BBAAB" (i.e., User A is assigned touch points {(7,4), (10,1)}, and User B is assigned touch points {(1, 2), (7, 1), (10, 4)}. Notably, the actual two valid user assignment configurations additionally include the assignment of touch points {(1,0), (5, 2)} to User A, as determined through execution of the algorithm represented by process 500. Thus, the two actual valid assignment configurations identified are: (1) User A is assigned touch points {(1,0), (5, 2), (7, 1), (10, 4)}, and user B is assigned touch points {(1, 2), (7, 4), (10, 1)}); and (2) User A is assigned touch points {(1,0), (5, 2), (7,4), (10,1)}, and User B is assigned touch points {(1, 2), (7, 1), (10, 4)}.

Notably, in the example depicted by FIGS. 8 and 9, application of the algorithm represented by process 500 and then application of the above-noted test reduced the number of possible valid assignment configurations (or solutions) to two assignment configurations (or solutions) that are truly ambiguous. More generally, application of the algorithm represented by process 500 and application of the above-noted test may reduce the number of possible assignment solutions to multiple truly ambiguous solutions or to a single unique solution. However, if multiple solutions are identified, heuristic methods may then be used to choose among the multiple identified solutions. The calculations employed by the heuristic methods, however, are simplified in that the methods need only distinguish between user assignment solutions that are within a smaller set of identified truly ambiguous solutions, thereby decreasing the chance of error.

Application of the above-noted test for each of the possible remaining user assignment configurations, however, may be computationally intensive. That is, the number of possible user assignment configurations that have to be tested increases exponentially with the number of possibly-ambiguous touch points that remain after application of the algorithm represented by process 500.

To avoid this, an improved algorithm may start by assigning all the points that are unambiguous according to the algorithm represented by process 500. It may then recursively consider all possible cases for the points with multiple candidate users. To decrease the number of paths to be searched, a path may be rejected if a user has a touch in a given column or row, but no points assigned to that user with that x or y coordinate, and no unassigned points with that x or y coordinate, since such a path could never lead to a correct solution.

Figure 10:
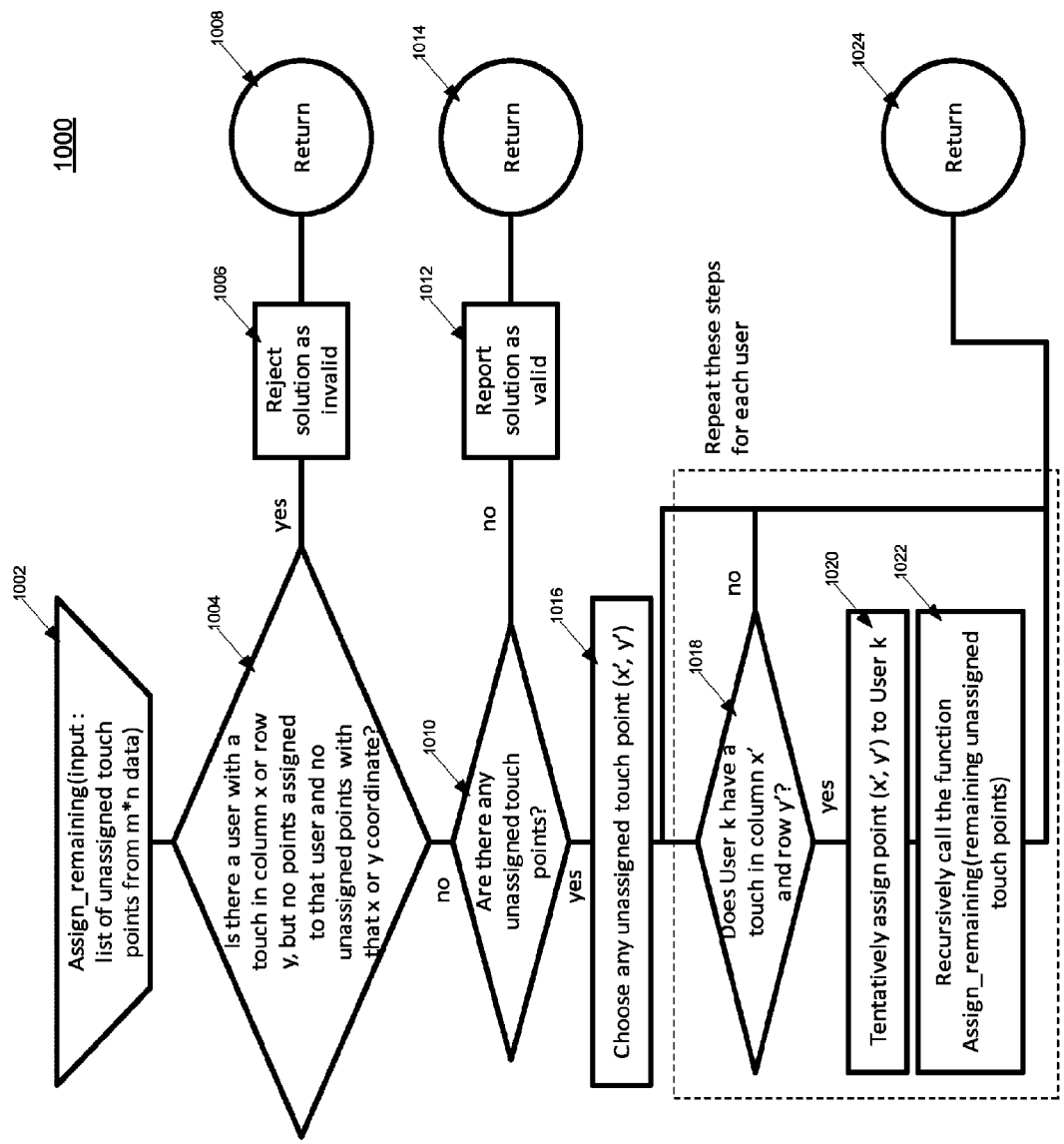
FIG. 10 is a block diagram illustrating a process used to assign touch points to different users based on m*n touch data and user-specific m+n touch data.

FIG. 10 is a block diagram illustrating a process 1000 that may be used to assign touch points to different users based on m*n touch data and user-specific m+n touch data after application of the process 500 shown in FIG. 5. The process 1000 begins after the initially-unambiguous points have been assigned in accordance with process 500 and represents the following algorithm:

```
function assign_remaining(input : list of unassigned touch points from m*n data)
    for each user
        for each row and column in which the user's m+n data indicate a touch point
            if user has no assigned touch points from the m*n data with that row or column
                if no unassigned points from the m*n data remain with that row or column
                    discard this possible solution
                    return
    end
```

```
                end
            end
        end
        if zero touch points from the m*n data remain unassigned
            report this solution as valid
            return
        end
        choose any one touch point from list of unassigned touch points from the m*n data
        for each user
            if the user's m+n column data show a touch at the touch point's x value
                if the user's m+n row data show a touch at the touch point's y value
                    assign point to that user
                    assign_remaining(all remaining unassigned touch points from the m*n
                        data)
                end
            end
        end
end
```

Referring to FIG. 10, a list of touch points that remain unassigned after execution of the algorithm represented by process 500 is received as part of a call to the function Assign_remaining (1002). In the example depicted by FIG. 8, the list of unassigned touch points may include touch points {(1, 2), (7, 1), (7, 4), (10, 1), (10, 4)}, as touch points {(1,0), (5, 2)} have already been assigned to User A.

The algorithm represented by FIG. 10 may be visualized as proceeding down a user assignment configuration tree. For example, when applied to the example depicted by FIG. 8, the algorithm may be visualized as proceeding down the user assignment configuration tree 1100 depicted in FIG. 11. The algorithm may begin by selecting a user assignment configuration represented by a node in the tree and then testing the user assignment configuration to determine whether the user assignment configuration represented by the node corresponds to an invalid solution. If the user assignment configuration represented by the node corresponds to an invalid solution, the node and, notably, all of its subnodes are not considered further and the process proceeds along another path in the tree. In this manner, the algorithm represented by FIG. 10 more efficiently prunes away user assignment solutions from the solution space than was possible through the simple application of the test described previously with respect to FIG. 9, thereby decreasing the runtime of the algorithm significantly.

After receiving the unassigned touch points, a node in the user assignment configuration tree is selected and a determination is made whether a user exists (for the particular user assignment configuration represented by the selected node) that has a touch in column x or row y, but no points assigned to that user and no unassigned points with that x or y coordinate (1004). If a user exists that has a touch in column x or row y, but no points assigned to that user and no unassigned points with that x or y coordinate, then the user configuration represented by the selected node is rejected as being invalid (1006) and the processing returns from the function call (1008). The processing may then go up to a higher node and select a new node in the user assignment configuration tree along a different path that has yet to be analyzed. The function Assign_remaining may then be recursively called for the new node, with the list of unassigned touch points corresponding to the unassigned touch points for the new node. If all paths have already been analyzed, process 1000 may end.

Figure 11:
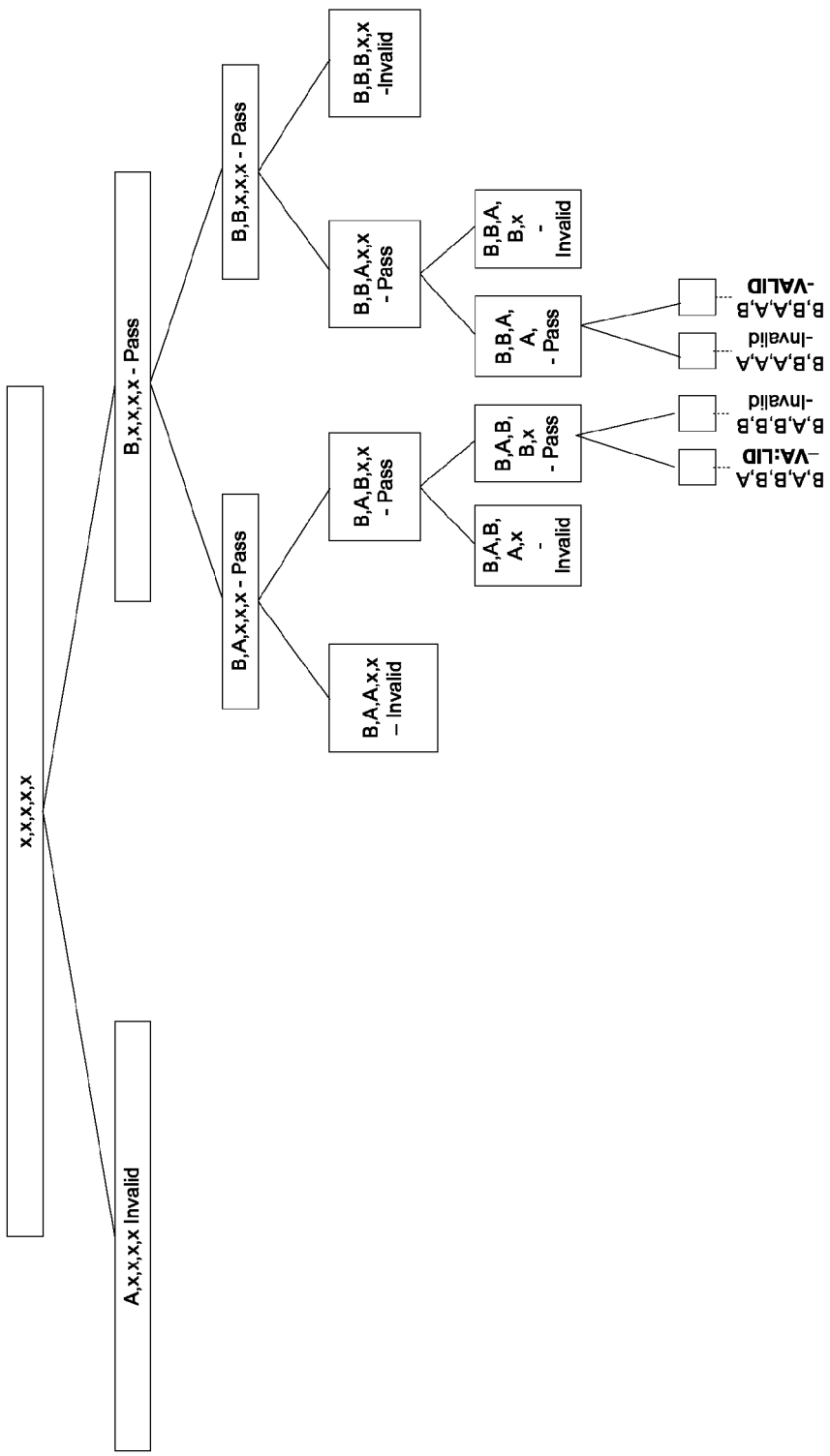
FIG. 11 is a tree diagram illustrating a number of different possible user assignment configurations for a set of detected touch points.

For the example depicted by FIG. 8, the node selected from the user assignment configuration tree 1100 may be the node "A,x,x,x,x," which corresponds to the User A being assigned touch points {(1,0), (5, 2), (1, 2)}, User B not being assigned any touch points, and touch points {(7, 1), (7, 4), (10, 1), (10, 4)} remaining unassigned. The result of operation 1004 is a determination that the solutions represented by node "A,x,x,x,x" are invalid because User B needs a point with x=1. Therefore, node "A,x,x,x,x" and all of its subnodes need not be considered further and the processing goes back up to the higher level node "x,x,x,x,x" and goes down another path in the tree. As shown in FIG. 11, node "B,x,x,x,x" may then be selected for consideration and the function Assign_remaining may be recursively called for node "B,x,x,x,x."

If execution of operation 1004 for the user assignment configuration represented by the selected node results in the user assignment configuration not being rejected as invalid, then the user assignment configuration represented by the selected node passes (i.e., cannot be determined to be invalid from the test), and a determination is made whether any touch points remain unassigned (1010). If no touch points remain unassigned, then the solution is reported as valid (1012) and the process returns from the function call (1014). The processing may then go up to a higher node and select a new node in the user assignment configuration tree along a different path that has yet to be analyzed. The function Assign_remaining may then be recursively called for the new node, with the list of unassigned touch points corresponding to the unassigned touch points for the new node. If all paths have already been analyzed, process 1000 may end.

If at least one touch point remains unassigned, then an unassigned touch point is selected (1016) and a determination is made whether a User K of the multiple users has a touch in column x' and a touch in row y', where the location of the unassigned touch point is (x', y') (1018). If the User K does not have a touch in column x' and a touch in row y', then another user is selected from the multiple users as User K and the processing proceeds back to operation (1018). If the User K does have a touch in column x' and a touch in row y', then the unassigned touch point at (x', y') is tentatively assigned to User K (1020). The tentative assignment of the touch point at (x', y') to User K corresponds to a selection of a subnode in the user assignment configuration tree and the function Assign_remaining is then recursively called for the newly selected subnode (1022). Operations 1018, 1020 and 1022 are repeated for each user of the multiple users. After all of the users have been considered, the process returns from the function call (1024). The processing may then go up to a higher node and select a new node in the user assignment configuration tree along a different path that has yet to be analyzed. The function Assign_remaining may then be recursively called for the new node, with the list of unassigned touch points corresponding to the unassigned touch points for the new node. If all paths have already been analyzed, process 1000 may end.

Continuing the example depicted by FIG. 8, the next node to be considered is the node "B,x,x,x,x," which corresponds to the User A being assigned touch points {(1,0), (5, 2)}, User B being assigned touch point {(1, 2)}, and touch points {(7, 1), (7, 4), (10, 1), (10, 4)} remaining unassigned. The result of operation 1004 is a determination that the solutions represented by node "B,x,x,x,x" are NOT necessarily invalid. A determination is made that touch points remain unassigned (1010) and, therefore, the first of the four unassigned touch points (i.e., touch point (7, 1)) is selected (1016). User A is selected and a determination is made that User A has a touch in column 7 and row 1 (1018) based on the m+n touch data for User A. The touch point (7, 1) is, therefore, tentatively assigned to User A (1020), which corresponds to the selection of the subnode "B,A,x,x,x" in the user assignment configuration tree. The function Assign_remaining is then recursively called to analyze the user configuration represented by the subnode "B,A,x,x,x."

Executing the algorithm represented by process 1000 for the example touch data depicted by FIG. 8, results in a consideration of the following possible solutions:

(c2, r2), then the data are truly ambiguous. The algorithm specified above will enumerate all the possible assignments, where the number of such assignments, if multiple sets of four points in this truly ambiguous configuration exist, will be exponential in that number. But it may be preferable to instead identify these sets of four points immediately, mark them as truly ambiguous, and proceed with only one further path in the search.

In all of the discussion above, the position of a touch point was assumed to be quantized, to correspond to exactly one row and one column. In a practical implementation, the touch point positions are interpolated, and may be represented with finer resolution than the electrode pitch. In practice, all of the comparisons for exact equality are replaced with comparisons to within some tolerance, where that tolerance is determined by the amount of noise or other inaccuracy in the system.

The discussion further assumed that any touch point was touched by only a single user. It is physically impossible for two users to be touching at the exact same location, but depending on the resolution with which the position may be determined, it may be possible for two users to be touching very close to each other, so that their two touches appear to be a single touch in the m*n touch data. In this case, the algo-

---

```
try with UserA={(1, 0), (5, 2), (1, 2)} UserB={ } unassigned={(7, 1), (7, 4), (10, 1), (10, 4)}
    reject--UserB needs point with x=1
    try with UserA={(1, 0), (5, 2)} UserB={(1, 2)} unassigned={(7, 1), (7, 4), (10, 1), (10, 4)}
        try with UserA={(1, 0), (5, 2), (7, 1)} UserB={(1, 2)} unassigned={(7, 4), (10, 1), (10, 4)}
            try with UserA={(1, 0), (5, 2), (7, 1), (7, 4)} UserB={(1, 2)} unassigned={(10, 1), (10, 4)}
                reject--UserB needs point with x=7
            try with UserA={(1, 0), (5, 2), (7, 1)} UserB={(1, 2), (7, 4)} unassigned={(10, 1), (10, 4)}
                try with UserA={(1, 0), (5, 2), (7, 1), (10, 1)} UserB={(1, 2), (7, 4)} unassigned={(10, 4)}
                    reject--UserB needs point with y=1
                try with UserA={(1, 0), (5, 2), (7, 1)} UserB={(1, 2), (7, 4), (10, 1)} unassigned={(10, 4)}
                    try with UserA={(1, 0), (5, 2), (7, 1), (10, 4)} UserB={(1, 2), (7, 4), (10, 1)} unassigned={ }
                        this is a valid solution
                    try with UserA={(1, 0), (5, 2), (7, 1)} UserB={(1, 2), (7, 4), (10, 1), (10, 4)} unassigned={ }
                        reject--UserA needs point with x=10
        try with UserA={(1, 0), (5, 2)} UserB={(1, 2), (7, 1)} unassigned={(7, 4), (10, 1), (10, 4)}
            try with UserA={(1, 0), (5, 2), (7, 4)} UserB={(1, 2), (7, 1)} unassigned={(10, 1), (10, 4)}
                try with UserA={(1, 0), (5, 2), (7, 4), (10, 1)} UserB={(1, 2), (7, 1)} unassigned={(10, 4)}
                    try with UserA={(1, 0), (5, 2), (7, 4), (10, 1), (10, 4)} UserB={(1, 2), (7, 1)} unassigned={ }
                        reject--UserB needs point with x=10
                    try with UserA={(1, 0), (5, 2), (7, 4), (10, 1)} UserB={(1, 2), (7, 1), (10, 4)} unassigned={ }
                        this is a valid solution
                try with UserA={(1, 0), (5, 2), (7, 4)} UserB={(1, 2), (7, 1), (10, 1)} unassigned={(10, 4)}
                    reject--UserA needs point with y=1
            try with UserA={(1, 0), (5, 2)} UserB={(1, 2), (7, 1), (7, 4)} unassigned={(10, 1), (10, 4)}
                reject--UserA needs point with x=7
```

---

The algorithm represented by process 1000, when applied to the example touch data depicted by FIG. 8, may be visually depicted by the user assignment configuration tree 1100 shown in FIG. 11. Notably, when comparing the algorithm represented by process 1000 to a process that simply tests all possible user assignment configurations that remain ambiguous after execution of the algorithm represented by process 500, the process 1000 is much less computationally intensive, as is visually evident by comparing FIG. 11 to FIG. 9. Moreover, the runtime savings significantly increase as the number of possibly ambiguous touch points identified by the algorithm represented by process 500 increases.

To further improve the runtime if many ambiguous solutions are present, ambiguous sub-problems may be identified and collapsed into a single path in the search. For example, if both User A and User B are touching columns {c1,c2} and rows {r1,r2}, and touch points exist in the m*n data at all four points (c1, r1), (c1, r2), (c2, r1), and rithm above may be modified, to also consider solutions where a single touch point is assigned to multiple users. This may increase the number of possible solutions reported, where the choice among those solutions is again made heuristically.

While the implementations noted above have focused on disambiguating touch data captured by a capacitive touch sensor, the above-noted techniques are not limited to capacitive touch sensors. That is, the above-noted techniques can be used to process and disambiguate touch data captured by any type of touch sensor or sensors that is capable of capturing both touch data projected onto axes and touch data over a complete area. The above-noted techniques also can be used to more generally disambiguate data captured by multi-input systems wherein the systems capture input data that corresponds to a selection of one or more locations over a complete display area and user-specific selection of locations projected onto display axes.

II. A System that Captures M*N Touch Data and User-Specific M+N Touch Data

Typically, the m+n measurements made are the capacitance from each row and each column to ground. The user touching the touch sensor will have some capacitive connection to the controller's ground node, for example if the user is holding the case of the touch sensor device, or the controller's ground node is connected to the building's safety grounding system, and the user is close to some other object grounded to that system. Typically, a voltage is applied to the row or column under test, with frequency around 100 kHz and peak-to-peak magnitude between 1 V and 200 V. When the user touches that row or column, current will flow out of the row or column, through the user, to ground. The magnitude of the current flowing out of the row or column is measured, and used to calculate the capacitance from that row or column to ground. A block diagram of selected portions of this system is shown in FIG. 12.

Figure 12:
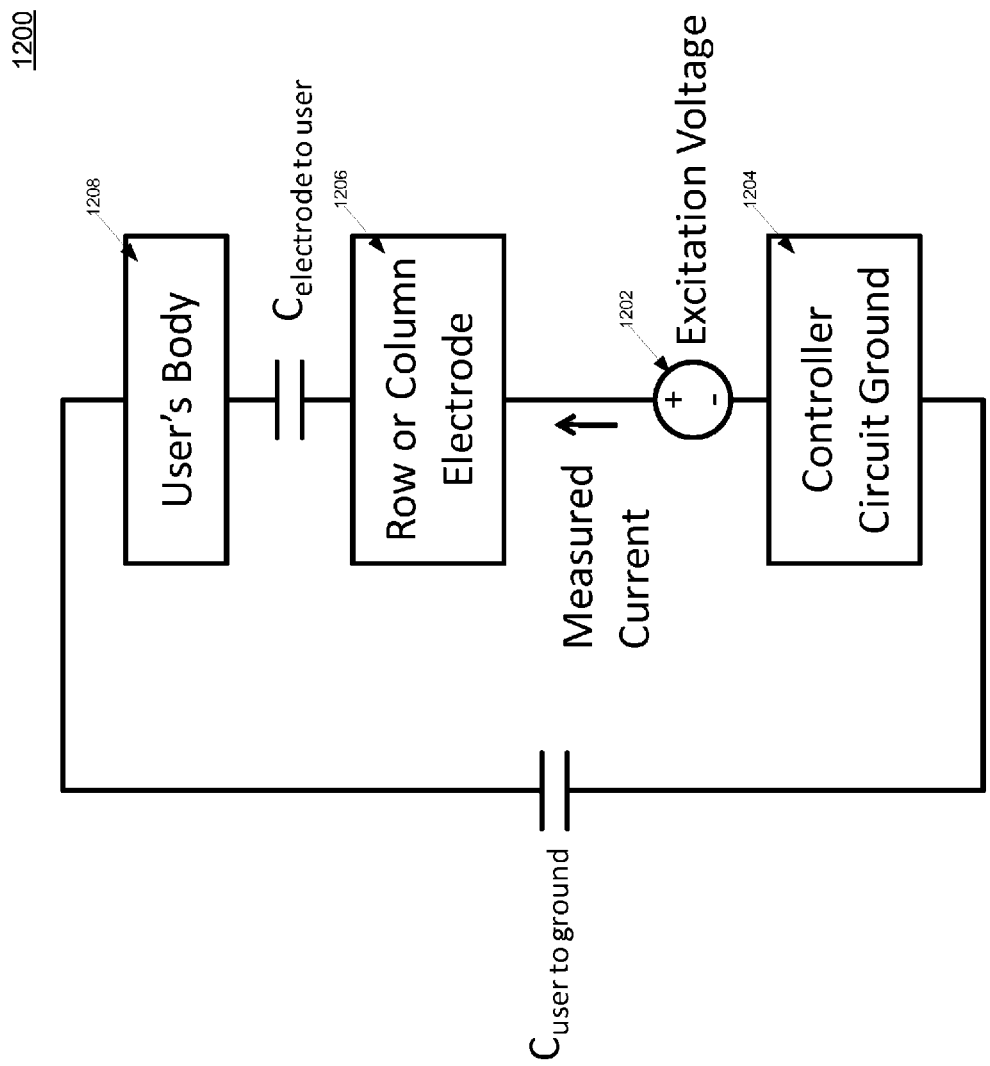
FIG. 12 is a diagram of a touch sensor system configured to capture m+n touch data.

Specifically, referring to FIG. 12, a system 1200 includes a controller that applies an excitation voltage 1202 between a controller circuit ground 1204 and a row or column electrode 1206 of a touch sensor grid. A user that is touching the row or column electrode 1206 of the touch sensor grid has a capacitance between the user's body 1208 and the row or column electrode 1206 represented by $C_{electrode\ to\ user}$. The capacitance between the user's body 1208 and the controller circuit ground 1204 is represented by $C_{user\ to\ ground}$. The system 1200 is configured to detect touch by the controller applying the excitation voltage 1202 to the row or column electrode 1206 and then measuring the current that flows from the controller to the row or column electrode 1206. The measured current may be used to calculate the capacitance from the row or column electrode 1206 to the controller circuit ground 1204 and will notably vary from a baseline value when a user is touching the row or column electrode 1206. By detecting the variation (or lack thereof) in the capacitance from the row or column electrode 1206 to the controller circuit ground, the system 1200 is able to determine whether or not a user is touching the corresponding row or column electrode 1206. Because of cost considerations, the application of the excitation voltage 1202 and the measurement of the current by the controller typically proceeds serially, one row or column at a time. However, in some implementations, application of the excitation voltage 1202 and measurement of the current may proceed in parallel for multiple rows and/or columns simultaneously. Irrespective of whether the measurements are made serially or in parallel, a total of m+n measurements are made for an m by n touch sensor. The system 1200, however, is limited in its ability to detect touch in that it is not configured to capture m*n touch data or user-specific m+n touch data.

Figure 13:
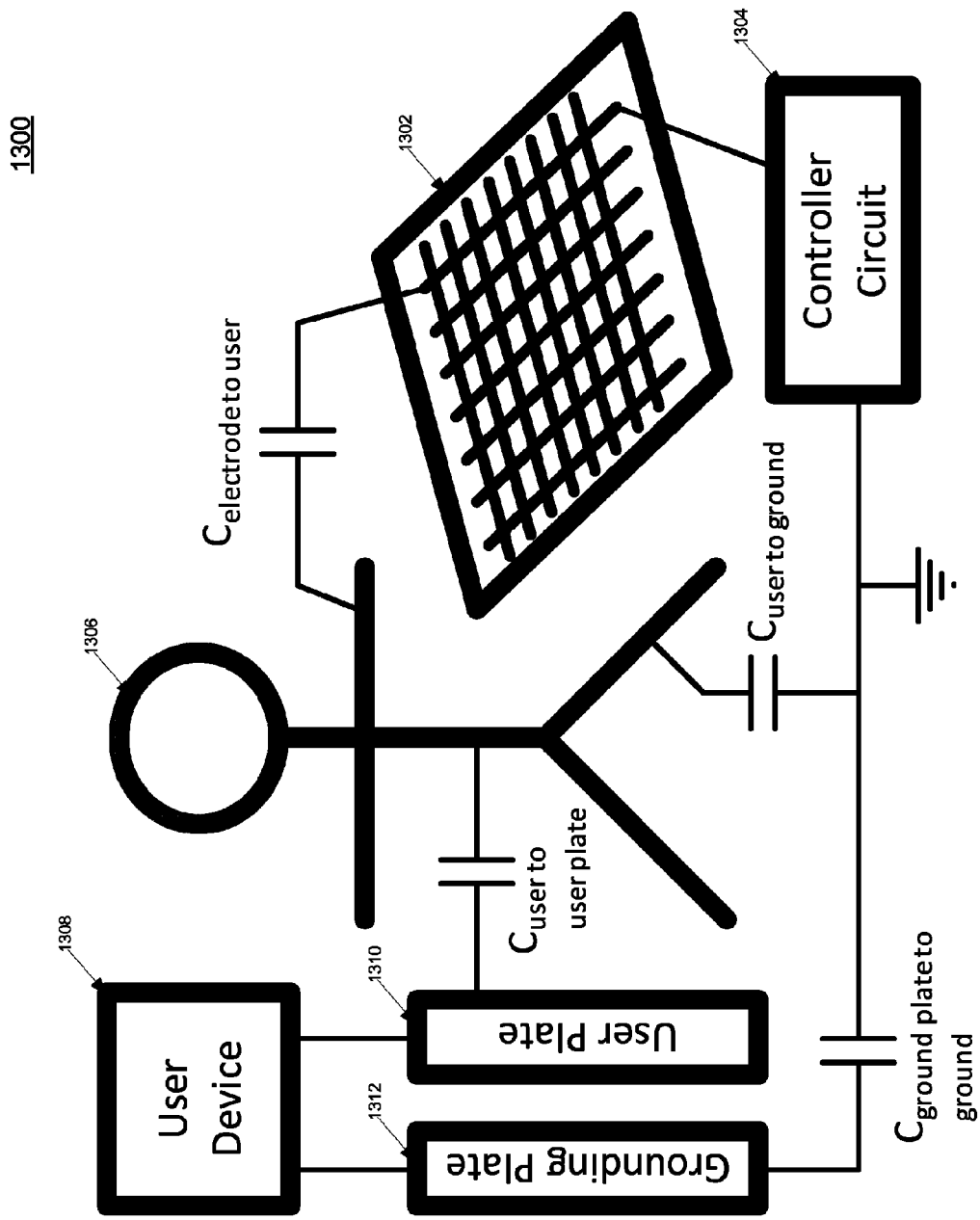
FIG. 13 is a diagram of a touch sensor system configured to capture m*n touch data and user-specific m+n touch data.

FIG. 13 shows a system 1300 that is able to detect both m*n touch data and user-specific m+n touch data. The system 1300 includes a touch sensor grid 1302 having a controller circuit 1304. A user 1306 is among one or more users that may touch the touch sensor grid 1302. Each user 1306 carries a user device 1308 that, as described further below, is configured to enable the system 1300 to capture user-specific m+n touch data. The user device 1308 is associated with a particular user 1306 and may be carried by the user 1306. The user device 1308 may include two electrodes, and be configured to measure the current flowing between those two electrodes. As shown in FIG. 13, one electrode may be a grounding plate 1312 and the other electrode may be a user plate 1310. The user plate 1310 may be attached capacitively to the body of the user 1306, for example by placing it in close contact to the user's skin. The grounding plate 1312 may be configured to be capacitively coupled to the surroundings of the user 1306. For example, the grounding plate 1312 may be attached to a metal plate that is capacitively coupled to the surroundings of the user 1306.

In some implementations, the electrodes 1310 and 1312 may take the form of a coat, lined with conductive material (e.g., aluminum foil or mesh) on both the inside and the outside, with no connection between the inside and outside conductors. The inside lining is capacitively coupled to the user and acts as the user plate 1310, and the outside lining acts as the grounding plate 1312 and is capacitively coupled to the user's surroundings, which may be at the same electrical potential as the ground node of the controller circuit. In other implementations, the electrodes 1310 and 1312 may take the form of a shoe, with the grounding plate 1312 on the bottom, coupling through a sufficiently conductive (e.g., carpet on top of concrete) floor, and the user plate 1310 inside, contacting the user's foot.

The user device 1308 may be configured to measure current between the user plate 1310 and the grounding plate 1312, and alternately apply an excitation voltage between the user plate 1310 and the grounding plate 1312. As described in more detail below with respect to FIGS. 14 and 15, by being able to both measure current and apply an excitation voltage between its two electrodes, the user device 1308 allows the system 1300 to capture user-specific m+n touch data.

The touch sensor grid 1302 includes conducting rows and columns, arranged in a two-dimensional grid (also referred to as a matrix). As noted previously, the designation of one particular axis as the rows vs. columns is arbitrary. The specific geometry of the row and column conductors may vary according to the conducting material used to realize them. As also stated previously, for example, the rows and columns may be arranged in a diamond pattern, with indium tin oxide as the conducting material; or the rows and columns may be formed using metal wires (for example, copper or silver wires) sufficiently thin to be inconspicuous when the touch sensor is placed in front of a display. The grid 1302 may include transmitters able to apply the excitation voltage to the columns (or rows) of the grid 1302 and receivers (i.e., sensors) able to measure current into or out of the rows (or columns) of the grid 1302 under the control of the controller circuit 1304. In other implementations, the controller circuit 1304, rather than the grid 1302, includes these transmitters and receivers.

The controller circuit 1304 is a circuit configured to interact with the sensor grid 1302 and, in some implementations, may be integrated with the sensor grid 1302. Specifically, the controller circuit 1304 is configured to control the application of an excitation voltage to the columns (or the rows) of the sensor grid 1302 and the measurement of currents into or out of the rows (or the columns) of the sensor grid 1302. The controller circuit 1304 may communicate directly with the user device 1308 wirelessly or via a wired connection, and/or may communicate with the user device 1308 wirelessly through the grid 1302. As described in further detail below, the controller circuit 1304 and the user devices 1308 communicate with each other to coordinate the collection of the user-specific m+n column touch data and the user-specific m+n row touch data.

FIG. 13 also shows the capacitance between the user 1306 and the user plate 1310 as $C_{user\ to\ user\ plate}$, the capacitance between the ground plate 1312 and the ground node of the controller circuit 1304 as $C_{ground\ plate\ to\ ground}$, the capacitance between the user 1306 and the ground node of the controller circuit 1304 as $C_{user\ to\ ground}$, and the capacitance between a row or column electrode of the grid 1302 and the user 1306 as $C_{electrode\ to\ user}$. The user device 1308 may be a wireless device remote from the controller circuit 1304 and the grid 1302. However, in some implementations, the user device 1308 is connected to the controller circuit ground of the controller circuit 1304 by a wire. In these implementations, the capacitance $C_{ground\ plate\ to\ ground}$ is replaced with a short circuit, connecting the ground plate directly to the ground node of the controller circuit 1304.

Figure 17:
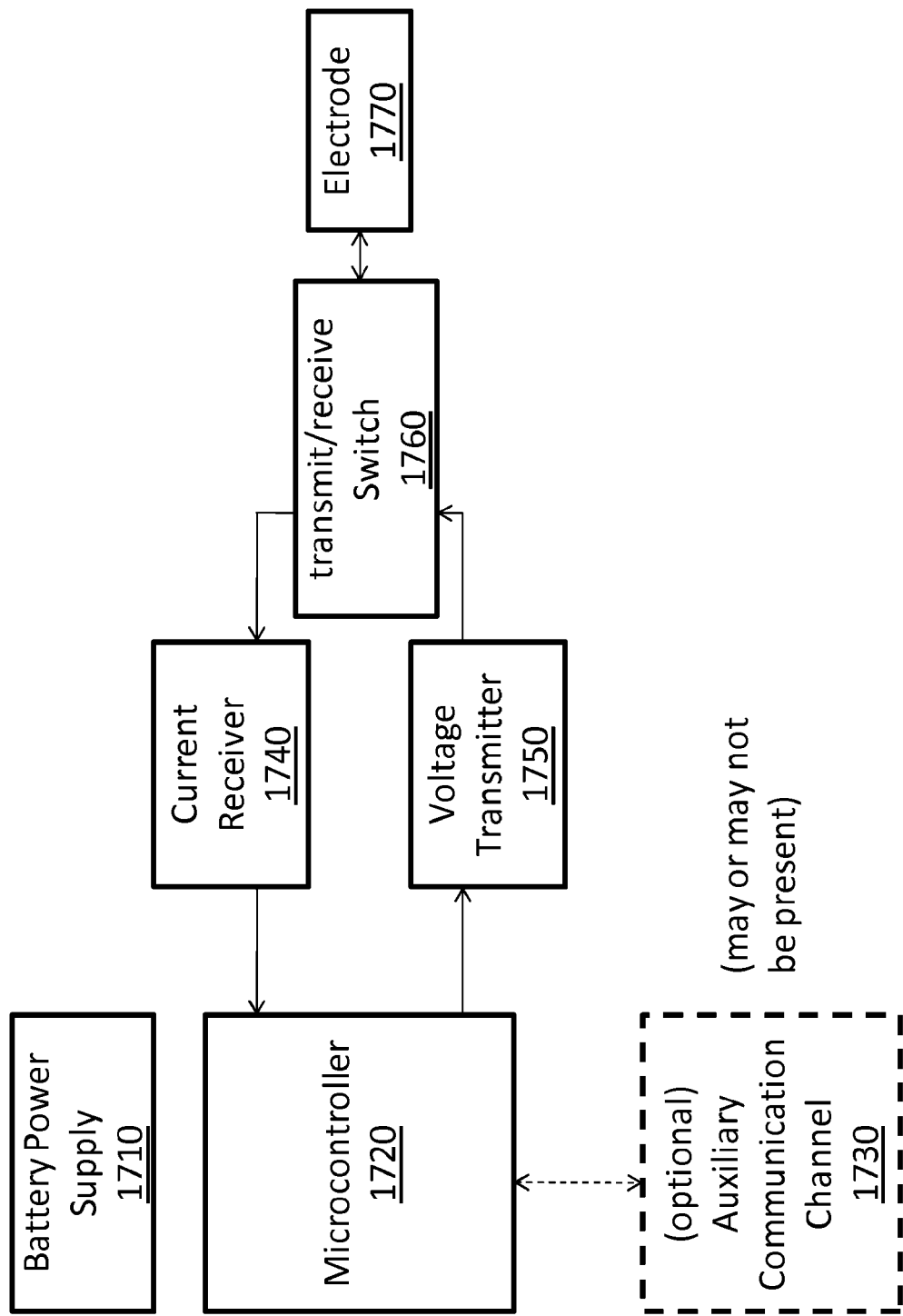
FIG. 17 is a block diagram of a user device.
Figure 18:
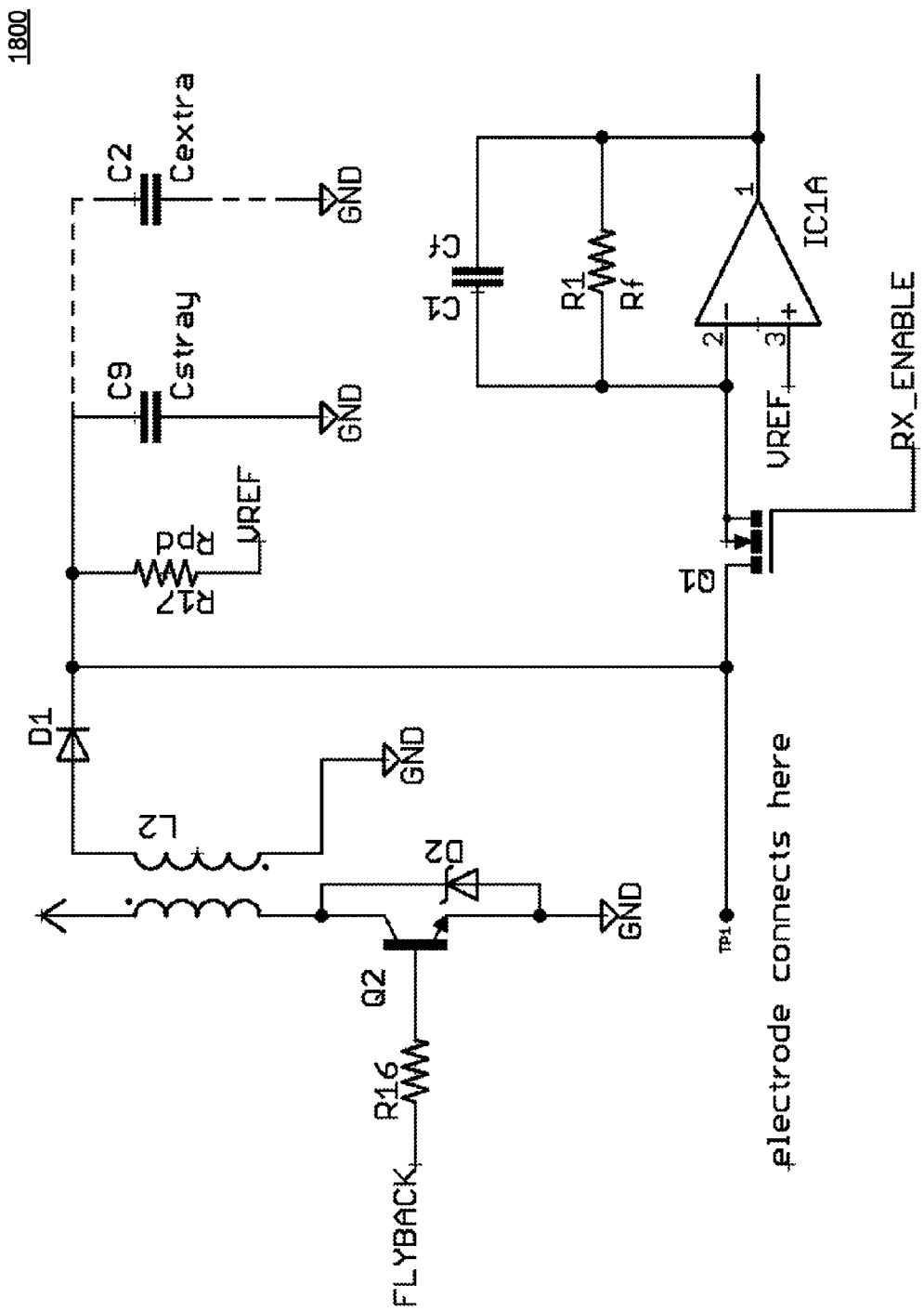
FIG. 18 is a block diagram of a circuit to transmit and receive signals on a single electrode.

An implementation example of the user device 1308 is shown in FIGS. 17 and 18 and described in further detail below. Notably, the user device 1308 corresponds in structure to the electrostatic stylus described in copending Application Serial Numbers xx [21024-0145001 and 21024-0147001], which are incorporated herein by reference for all purposes, with the node that was previously connected to the tip of the stylus instead connected to the user's body.

Figure 14:
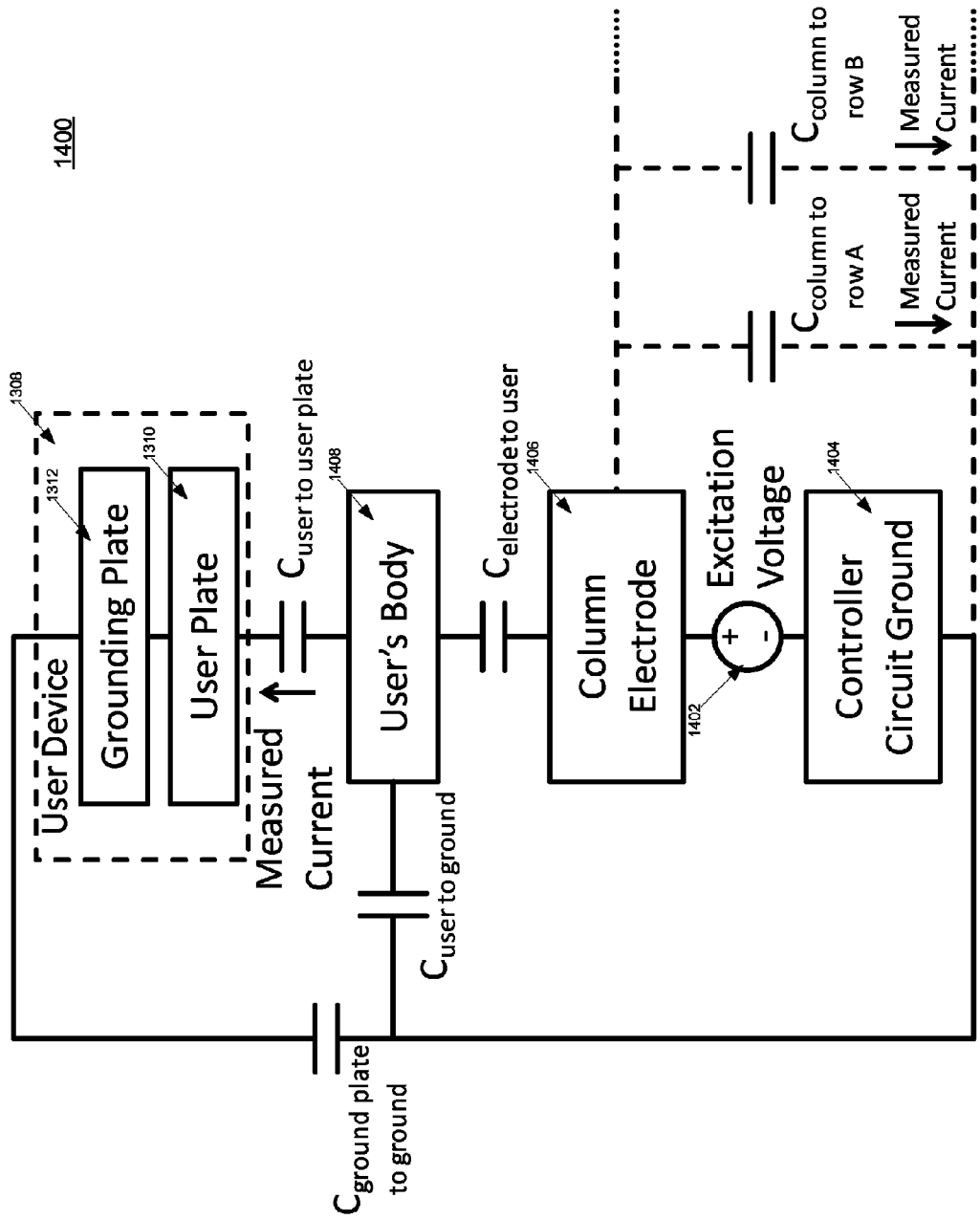
FIG. 14 is a diagram of the touch sensor system of FIG. 13 when the touch sensor grid of the system is energized to capture m*n touch data and to capture user-specific m+n column touch data.

FIG. 14 is a circuit block diagram 1400 illustrating the system 1300 when the system 1300 is capturing m*n touch data and user-specific column touch data (also referred to as m+n column touch data). As shown in FIG. 14, the controller circuit 1304 is configured to apply an excitation voltage 1402 between the controller circuit's ground 1404 and the column electrode 1406 under test. Notably, while the implementation shown in FIG. 14 depicts the controller circuit 1304 applying the excitation voltage 1402 between a column electrode 1406 of the grid 1302 and the controller circuit's ground 1404, in other implementations the controller circuit 1304 applies the excitation voltage 1402 instead between a row electrode of the grid 1302 and the controller circuit's ground 1404. As stated previously, the designation of one particular axis of the grid 1302 as the rows vs. columns is arbitrary.

The user device 1308 carried by the user 1306 is configured to measure the corresponding current generated by the excitation voltage 1402 between the user plate 1310 and the grounding plate 1312, which will be roughly proportional to the capacitance from the column electrode 1406 to the user's body 1408. If each user 1306 carries a device 1308, and the measurement is made separately for each user, then m+n column touch data will be acquired for each user, with only that user's touch points. Accordingly, as each column electrode 1406 is energized, the user-specific measurements necessary to determine which users of the multiple users are touching the energized column electrode 1406 are made in parallel by the various user devices 1308. After all column electrodes in the grid 1302 have been energized, the m+n column touch data for all users will have been acquired.

Notably, the same excitation voltage 1402 that is used to energize the column electrodes 1406 to obtain the user-specific m+n column touch data also may be used to obtain the all-users m*n touch data. That is, while the excitation voltage 1402 is applied to the column electrode 1406 under test, the other column electrodes of the grid 1302 may be held at a constant voltage. The current into each row electrode of the grid 1302 is then measured by the controller circuit 1304, with the currents for all the row electrodes being measured in parallel, producing m measurements. This measurement of row electrode currents is represented in FIG. 14 by the arrows indicating the measured currents flowing from the energized column electrode 1406 to row A, to row B, etc. Thus, for an m by n grid, m row electrode currents are measured in parallel when the column electrode 1406 is energized. This process is repeated for each column electrode of the grid 1302, which means that it is repeated n times for an m by n grid, producing m*n total measurements. Accordingly, after all of the column electrodes have been energized in sequence, the user-specific m+n column touch data will have been captured through the measuring of the currents by each user's user device 1308, and the m*n touch data for all users also will have been captured through the measuring of the various column electrode to row electrode currents.

As described above with respect to FIG. 14, the system 1300 may be used to concurrently capture the m*n touch data and the user-specific m+n column touch data by energizing each column electrode 1406 in sequence and then each user device 1308 measuring its user plate to grounding plate current and the controller circuit 1304 measuring in parallel the column to row electrode current for each row of the grid 1302. Measuring the user-specific row touch data (also referred to as m+n row touch data) could be done in the same manner used to measure the user-specific m+n column touch data. That is, the controller circuit 1304 could apply an excitation voltage to energize each row electrode in the grid 1302 and then the user devices 1308 could measure their user plate to grounding plate current to determine if their respective users are touching the energized row electrode. However, measuring the user-specific m+n row touch data in this manner may require modifications to the hardware of the controller circuit 1304 that may not be necessary for capturing the m*n touch data. That is, the controller circuit 1304 would now have to be able to alternately measure the current into each row and apply an excitation voltage on that same row. Such a modification of the controller circuit 1304 may substantially increase its complexity and hardware costs. This modification may also require the addition of one time slot in the frame for each row. For an approximately square display, this may approximately double the number of time slots. This may require the system either to operate at reduced frame rate, or to operate with reduced integration time for each time slot, either increasing the system latency or increasing measurement noise respectively.

Figure 15:
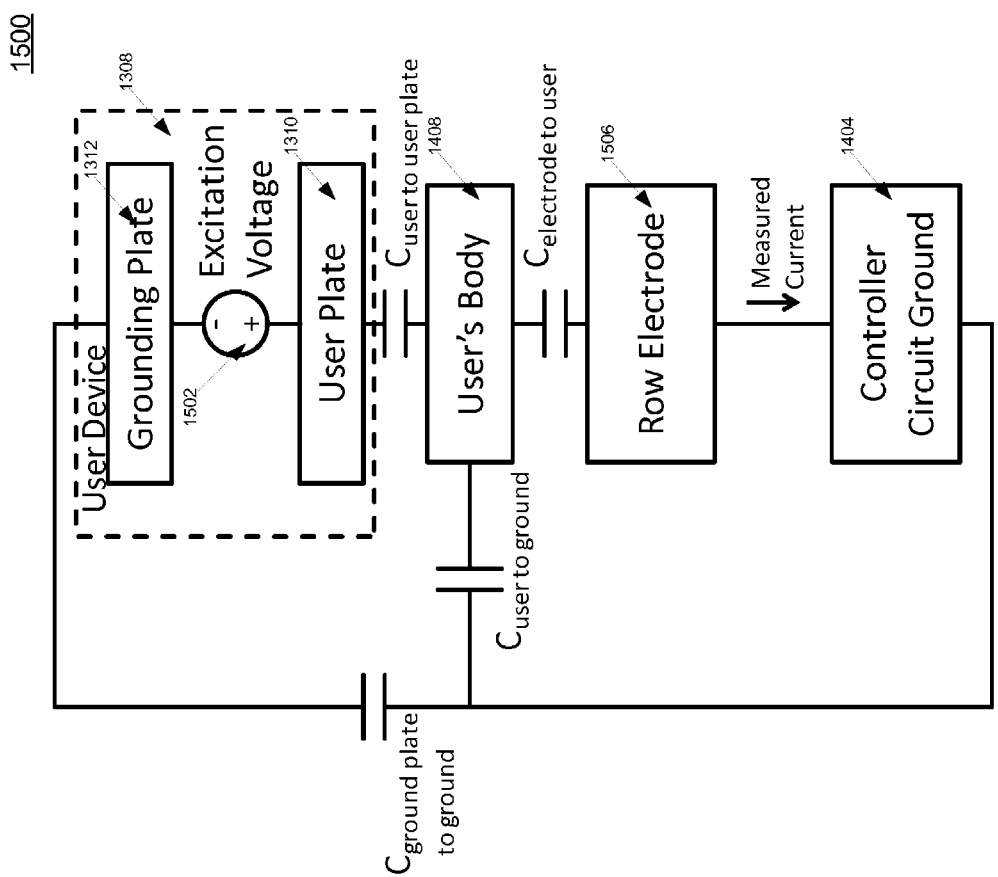
FIG. 15 is a diagram of the touch sensor system of FIG. 13 when the user device of the system is energized to capture user-specific m+n row touch data.
Figure 16:
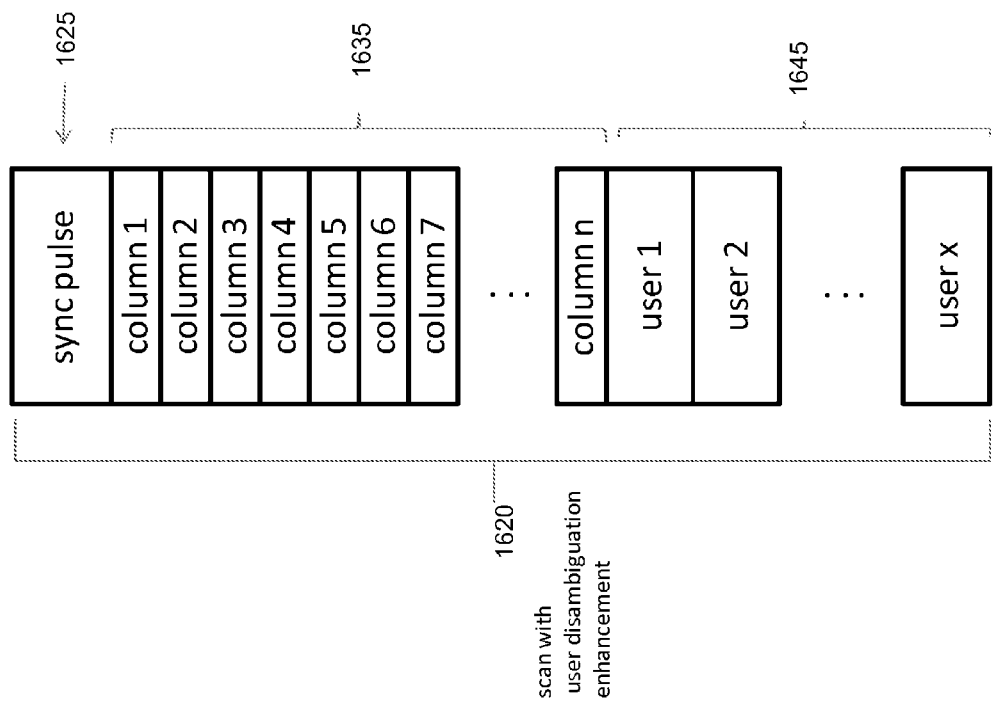
FIG. 16 is a diagram showing a division of a frame into time slots.

FIG. 15 is a circuit block diagram 1500 illustrating the system 1300 when the system 1300 is capturing user-specific m+n row touch data. Rather than energizing the row electrodes and then measuring the corresponding currents at the user device 1308, the flow of energy may be reversed, so that the excitation voltage is instead applied across the two electrodes of the user device 1308. As shown in FIG. 15, the user device 1308 may apply an excitation voltage 1502 between its user plate 1310 and its grounding plate 1312. The controller circuit 1304, which is already equipped with current sensors for each row electrode that were used to capture the m*n touch data, again uses those sensors but now uses them to measure the current into each row electrode 1506 of the grid 1302 when the excitation voltage 1502, rather than the excitation voltage 1402, is applied. As before, all row electrode currents may be measured in parallel while the excitation voltage 1502 is applied. The current is roughly proportional to the capacitance from the user's body 1408 to the row electrode 1506. Deviation of the measured capacitance from a baseline value for a particular row electrode indicates that the user having the user device 1308 that applied the excitation voltage 1502 is touching the particular row electrode. The energizing of each user device 1308 may be time-multiplexed, in the same way that the energizing of the columns of the sensor grid 1302 is time-multiplexed, by adding one additional timeslot in which the device carried by the user transmits. When multiple users are present, multiple timeslots are added, one for each device carried by the user. FIG. 16, as described in further detail below, illustrates an example frame and corresponding time slots that may be used by the system 1300 for coordinating the energizing of the columns of the sensor grid 1302 and the energizing of the various user devices 1308.

Notably, the capacitance from the controller circuit's ground 1404 to the grounding plate 1312, which is included in or otherwise attached to the user device 1308, must be large compared to the capacitance from the user's body 1408 to the row electrode 1506 or column electrode 1406. (The actual capacitance measured is the series connection of all the capacitances in the loop; this is roughly equal to the capacitance from the user's body 1408 to the row electrode 1506 or the column electrode 1406 only if all other capacitances in the loop are large by comparison.) This means that the grounding plate 1312 must have a relatively large area. Additionally, the user's body 1408 has some capacitance to the controller circuit's ground 1404, which forms a current divider, attenuating the measured signal. When the capacitance from the user's body 1408 to the ground 1404 is large (for example, when the user is standing barefoot on a concrete floor), a very large grounding plate 1312 is needed, on the order of two square feet in area, to decrease the ratio of that current divider.

If the grounding plate 1312 for the user device 1308 couples capacitively to the row electrode 1506 or the column electrode 1406, then it may inject or sense a current, with opposite sign from the desired current. To avoid false actuations due to this effect (if, for example, another person is in close contact with the user's grounding plate 1312, and that person touches the grid 1302), all current measurements may be performed with phase-coherent detection. Current with opposite sign will produce a negative result, and such measurements may be rejected. (A similar technique may be used with a capacitive stylus, to reject current coupled through the body of the user holding the stylus.)

FIG. 16 shows an example of a frame 1620 that may be used by the system 1300 to coordinate the timing of its various components. As shown in FIG. 16, the frame 1620 includes a synchronization pulse time slot 1625, n time slots 1635 for the n columns of the m by n grid 1302, and x time slots 1645 for the x users that carry or are otherwise associated with user devices 1308. During each of the n time slots 1635, one of the n columns of the m by n grid 1302 is energized (i.e., an excitation voltage 1402 is applied to the corresponding column electrode). The x user devices 1308 enable the m+n column touch data for the x users to be determined for the energized column by measuring corresponding currents between their two electrodes, and the row current sensors of the controller circuit 1304 enable the all-users m*n touch data to be determined for all points in the grid 1302 located at the energized column. During each of the x time slots 1645, one of the x user devices 1308 is energized (i.e., an excitation voltage 1502 is applied between its two electrodes). The row current sensors of the controller circuit 1304 enable the m+n row touch data for the particular user associated with the energized user device 1308 to be determined by measuring the m currents for the m row electrodes of the m by n grid 1302.

As described above, the user device 1308 associated with a particular user captures the user's m+n column touch data by receiving signals that are transmitted by energizing the columns of the grid 1302, and the controller circuit 1304 captures the user's m+n row touch data by receiving a signal transmitted by energizing the user's user device 1308. To allow such communication between the user device 1308 and the controller circuit 1304, the timebase of the user device 1308 is first synchronized with that of the controller circuit 1304. This may be achieved by transmitting a distinctive synchronization signal or pulse (e.g., at a different frequency, or modulated with a distinctive pattern) on all of the columns of the grid 1302. This provides a time reference to the user device 1308. The user device 1308 may maintain its time reference thereafter, using a crystal or other frequency standard within the user device 1308. The synchronization pulse may generally be transmitted once per frame such as, for example, in the synchronization pulse time slot 1625 of the example frame 1620 shown in FIG. 16. However, in some cases, it may be transmitted more or less often, according to the latency required of the system, and to the long-term accuracy of the frequency standard of the user device 1308. The user device 1308 can search for this synchronization pulse, and when the user device 1308 receives the synchronization pulse, reset its own timebase.

By the above-described process, the m+n row touch data for the x users and the all-users m*n touch data can be calculated within the control electronics on a host (e.g., a device with processing capabilities), which may be the controller circuit 1304 or may be another device configured to communicate with the controller circuit 1304. The user-specific m+n row touch data and the all-users m*n touch data may then be passed back to the application software as finger touch information (e.g., over a universal serial bus (USB) link back to a computer that executes the application software, which may be the host itself or a client computer in communication with the host). In other words, both the user-specific m+n row touch data and the all-users m*n touch data can be calculated on the basis of signals received by the row electrode sensors of the controller circuit 1304. Thus, the user-specific m+n row touch data can be calculated by the same part of the system 1300 that calculates the all-users m*n touch data, for example.

But the m+n column touch data for a particular user may be calculated within the user device 1308, and can be relayed back to the application software in a number of ways. In other words, the user-specific m+n column touch data can be calculated as a function of signals received by the user device 1308, and the column positions can be reported to the host (e.g., using a wireless or wired connection from the user device 1308 to the host). In one example, if the user device 1308 is wired to the host, for example, then the communication link can be established with this wiring, and the wiring can also provide a common ground for the controller circuit 1304 and the user device 1308.

In another example, the user device 1308 can transmit information to the host wirelessly. For instance, this information may be transmitted electrostatically through the grid 1302 itself, by adding multiple timeslots and transmitting the binary-coded m+n column touch data with one bit per timeslot. This requires no additional hardware, but instead can be accomplished by modifying the control software of the user device 1308 and/or the controller circuit 1304 to differently utilize the existing hardware. Specifically, this may be accomplished using the hardware that was otherwise used by the user device 1308 to generate the excitation signal 1502 for detecting the m+n row touch data. For example, the user device 1308 can transmit the m+n column touch data from the user device 1308 to the host through the grid 1302, where the transmitters and receivers that are used for capturing the all-users m*n touch data and the user-specific m+n touch data can also be used to transmit information using any wireless coding schemes that are used to transmit information over a wireless channel. A timeslot can thus be added for each bit of the coordinate, for example, and during that timeslot, the user device 1308 (or the controller circuit 1304/grid 1302) can transmit if the corresponding bit is a "1", or not transmit if the corresponding bit is a "0". This scheme corresponds to amplitude shift keying (ASK), but other coding schemes may be used. By adding the timeslots to the system, the information can be coupled from the user device 1308 back to the host through the grid 1302 using the existing hardware. An error-detecting or -correcting code may be used to improve the robustness of the system to random bit errors due to noise.

The user-specific m+n column touch data may also be transmitted by the user device 1308 to the host over an auxiliary channel, for example a radio-frequency communications channel, like an IEEE 802.15.4 link. By using the auxiliary channel, no additional time within the frame may be required to transmit the position through the grid 1302. This can allow the system to reserve more time to make the finger touch capacitance measurements, resulting in better signal-to-noise ratio (SNR). If the auxiliary channel is used to transmit the user-specific m+n column touch data, then that auxiliary channel may also be used to synchronize the time base of the control electronics with that of the user device 1308, removing the need for an additional timeslot for the synchronization pulse. This may further increase the available time within the frame, thus improving the SNR. Other types of communication channels may be used, including other radio frequency (RF) links, ultrasonic links, and optical links, for example.

The auxiliary channel may also improve performance, to the extent that it eliminates the need for a synchronization pulse transmitted through the grid 1302. The synchronization pulse is configured to appear on all columns (or, at least, many columns uniformly spaced throughout the grid 1302, for example, one in every three columns) in order to be received by the user device 1308 irrespective of the location of the touches of a user associated with/assigned to the user device 1308. Consequently, the total instantaneous transmitted energy is greater than when a single column is excited, and is more likely to cause electromagnetic compatibility (EMC) problems. If the synchronization pulse is instead transmitted over an auxiliary channel, then this effect is avoided, because transmitting the synchronization pulse through the grid 1302 becomes unnecessary.

The same path used to communicate the user-specific m+n column touch data may also be used to communicate other information, for example, the state of switches or other controls attached to the user device 1308.

FIG. 17 shows a block diagram of some of the components of the user device 1308. The user device 1308 includes a current receiver 1740, a voltage transmitter 1750, and a microcontroller 1720 to sequence operations between the current receiver 1740 and the voltage transmitter 1750. The user device 1308 also includes an electrode 1770 (which corresponds to the user plate electrode 1310) coupled to a transmit/receive switch 1760. The transmit/receive switch 1760 is coupled to the current receiver 1740 and the voltage transmitter 1750. To operate these active electronics, some power source is required, for example a battery power supply 1710 or a supercapacitor. If the screen size (i.e., the size of the grid 1302) is sufficiently small to make this practical, then the user device 1308 could also be powered inductively, e.g., from a coil behind or around the grid 1302. The user device 1308 may also optionally include an auxiliary communication channel 1730 for reasons described above.

In operation, the microcontroller 1720 sequences the process, where the software in the microcontroller 1720 is responsible at least for maintaining the sense of time, for reporting the user-specific m+n columns data back to the host, and so on. The microcontroller 1720 runs off of some internal power source (e.g., a battery power supply 1710, a supercapacitor, a rechargeable battery) in the user device 1308. The microcontroller 1720 is coupled to a current receiver 1740 (that may be similar to the receiver on the rows used when measuring m*n capacitive finger touch), and a voltage transmitter 1750 (that may be similar to the transmitter on the columns used when measuring m*n capacitive finger touch). A transmit/receive switch 1760 can be configured to allow the system to multiplex the current in the current receiver 1740 and the voltage in the voltage transmitter 1750 onto the one electrode 1770 in the user device 1308. The transmit/receive switch 1760 can allow a high voltage (e.g., around 100 V) output to be applied to the electrode 1770 in the transmit mode, and to receive a small current signal (e.g., around 1 uA) from the electrode 1770 in the receive mode.

The voltage transmitter 1750 and the current receiver 1740 can be configured to have a similar form to the transmitters and receivers attached to the columns and rows in the grid 1320, and make a similar measurement. Most classes of circuits that are suitable for exciting the column voltage and measuring the row current to determine finger touch on a capacitive sensor may also be suitable here. Non-coherent detection may be employed here, since it may not require as precise alignment of the timebase of the user device 1308 as would phase-coherent detection; although, this may cause false actuations due to the user device's return current, as discussed previously.

The above description may assume that only one entity (whether that entity is a column in the grid 1302, or a user device 1308) transmits at a time. This may represent an example of a simple implementation, but in some cases, it may be desirable for multiple entities to transmit orthogonal waveforms simultaneously. All of the techniques described above still work in this case (e.g., with multiple orthogonal frequencies, or with orthogonal pseudo-noise waveforms of the type used in CDMA communications). In this case, it may be possible to transmit a greater total energy per frame, improving signal-to-noise. In such an implementation, a more complex receiver may be used, to correlate for the multiple orthogonal waveforms simultaneously. Some techniques for transmitting orthogonal waveforms simultaneously are described in U.S. patent application Ser. No. 12/838,419, filed on Jul. 16, 2010, the disclosure of which is incorporated herein by reference for all purposes.

As described above, because the user device 1308 must both transmit and receive from a single electrode 1770, the electrode 1770 can see both large voltages and small currents. When transmitting, to achieve acceptable signal-to-noise in the receivers of the grid 1302, a peak-to-peak voltage swing around 100 V can be generated. When receiving, signals around a microamp can be resolved. Some type of transmit/receive switch or circuit is necessary to provide this dynamic range. An example circuit that achieves this is shown in FIG. 18.

FIG. 18 shows an implementation of a circuit 1800 in a user device 1308 for transmitting a large voltage and receiving a small current on a single electrode. The circuit 1800 includes a resistor R16 coupled to an input terminal ("flyback") and a transistor Q2. The transistor Q2 has a first terminal coupled to the resistor R16, a second terminal coupled to a ground node, and a third terminal coupled to a first winding of transformer L2. Zener diode D2 is coupled in parallel with the second and third terminals of transistor Q2, by being coupled with the ground node and the first winding of the transformer L2. The first winding of the transformer L2 is coupled to a power supply (e.g., a ~3 V battery voltage) and the third terminal of the transistor Q2. A second winding of the transformer L2 is coupled to the ground node and an anode of diode D1. A cathode of diode D1 is coupled to node TP1 where the electrode connects. Node TP1 is coupled to a first terminal of transistor Q1, a first terminal of pull down resistor Rpd, and optionally, a capacitor Cextra. The pull down resistor Rpd has a second terminal coupled to a voltage reference, VREF. Node TP1 also includes stray capacitances, which are modeled as a single stray capacitor Cstray to the ground node in FIG. 4. The transistor Q1 has a second terminal coupled to a switched signal for RX_ENABLE, and a third terminal coupled to the inverting input 2 of the amplifier IC1A. The non-inverting input 3 of the amplifier IC1A is coupled to voltage reference VREF. The output terminal 1 of the amplifier IC1A is coupled to a first terminal of feedback capacitor Cf and feedback resistor Rf, and the non-inverting terminal of the amplifier IC1A is also coupled to a second terminal of the feedback capacitor Cf and feedback resistor Rf.

In FIG. 18, the transmit/receive circuit uses a battery voltage (e.g., approximately 3 V) and generates a high voltage at ~100V (delivering tens of microamps of current at a maximum), and a receiver can be placed on the same node. The receiver may be disconnected, so that it does not affect the generated high voltage during transmission, and the transmitter may be disconnected, so that it does not affect the received signal during reception. The high voltage can be generated using a flyback circuit, similar to the flyback circuit used to excite a cathode ray tube display, or used in a switchmode power supply. The flyback circuit includes the transformer L2, which stores energy. Energy may flow into the first or primary winding of L2, be stored as a magnetic field, within the core of L2, and then flow out of the core of L2, through the secondary winding of L2. The voltage may be transformed according to the turns ratio of the transformer L2, and according to the timings of the applied signals. The energy flowing out through the secondary winding of L2 may flow into the stray capacitance at the output through D1, and develop the high voltage across that stray capacitance. That stray capacitance may be designed to be as small as practical, since the real power dissipated by this circuit, at least $0.5*Cstray*V^2*f$, can be proportional to that capacitance.

When transmitting, the high voltage AC is generated with a flyback transformer L2. To produce an excitation voltage with frequency f=1/T, and assuming a switch duty cycle of 50%, the switch Q2 is closed for a time 0.5*T. During this time, the current in the transformer, starting from zero, ramps up to a primary current of Ipri=(Vdd*0.5*T)/Lpri, where Vdd is the supply voltage, typically around 3 V, and Lpri is the primary inductance. When the switch opens, this stored energy is delivered to the stray capacitance Cstray at the output of the flyback circuit. Neglecting the resistor Rpd, the peak voltage may be calculated by equating the energy stored in the transformer inductance, $0.5*Lpri*Ipri^2$, with the energy stored in the output stray capacitance, $0.5*Cstray*Vpk^2$. The voltage can decay exponentially as Rpd*Cstray, where that product should be chosen on the same order as the excitation period, so that the output decays roughly back to zero every cycle. In practice, Cstray can be a capacitance in the picofarads, for example, and Rpd can be in the hundreds of kilohms. The transformer primary inductance can be in the hundreds of microhenries, and its turns ratio can be around 1:7. The resistor Rpd may be replaced with a switch to ground (for example, a FET or bipolar transistor). This can produce an approximate square wave, which is closer to the desired ideal sine wave than the repeated exponentials produced with a resistor.

When a high voltage is applied to the electrode, the receiver at IC1A may be protected from destruction by opening the switch Q1 (e.g., a transistor) to isolate the receiver in transmit mode. Otherwise, the receiver circuit IC1A would clamp the high transmit voltage, and possibly be destroyed by it. That circuit is therefore disconnected using the transistor, n-FET Q1. This n-FET can be chosen for a high voltage rating (i.e., a gate-drain voltage rating greater than the peak voltage seen at the electrode), and for low stray capacitance (which would increase the Cstray, and therefore decrease the acceptable Rpd and increase the total power consumption of the system when transmitting). This transistor Q1 is a discrete FET, and therefore can have its body node connected to its source node, which produces a parasitic diode; but this diode is always reverse-biased, since the voltage at the drain is always greater than the voltage at the source, which can mean that it does not affect the operation of the circuit. When transmitting, the gate voltage of Q1 is held at 0V, which puts a voltage –VREF (with VREF around 0.5*Vdd) on the gate, which turns the transistor off. When receiving, a voltage Vdd is applied to the gate of Q1. This can put a voltage (Vdd–VREF) on the gate, which turns the transistor on. The signal may therefore flow into the receiving transimpedance amplifier IC1A. As such, in the receiver mode, a high voltage can be placed on the gate of Q1 (e.g., RX_ENABLE pin) so that the transistor Q1 is conducting, and behaves like a short circuit. The stray capacitances, however, due to that transistor and due to the diode D1, cannot be disconnected. To a first order, additional impedances to ground at the inverting input of IC1A would not affect the closed loop transfer function; but for a practical amplifier with finite gain-bandwidth, this may not be the case. The capacitance Cstray does not significantly affect the closed loop transfer function of the receive amplifier. Rpd does not have a significant dynamic effect; it would introduce a significant DC error if connected to ground, but is connected to the same VREF as the opamp's non-inverting input to avoid this issue.

The transformer secondary inductance would introduce a significant error, but when receiving, the voltage at the anode of L2 is held close to ground by the transformer, and the voltage at the cathode is held at VREF>0. This means that the diode is reverse-biased, which means that it isolates the receive circuit from that transformer inductance. The same diode is therefore used as part of the flyback circuit, to allow only unidirectional current from the transformer secondary into the output capacitance, and to isolate the receiver from that flyback circuit, reducing parts count.

In some implementations, there may be a variation in the stray capacitance Cstray of 2:1 or more, which could produce a variation in the peak generated voltage. So circuit designs can be made with a sufficiently high voltage to achieve a desired signal to noise ratio with the highest possible capacitance Cstray, without generating a high enough voltage to cause a transistor to break down, even with the lowest possible Cstray. In some implementations, a deliberate capacitance (e.g., Cextra in FIG. 4) can be added in parallel with the stray capacitance Cstray. If the tolerance on this deliberate capacitance is better than that of the stray capacitance, then this has the effect of decreasing the variation in the peak voltage, but increasing the total capacitance, and therefore increasing total power consumption. In some implementations, instead of using a flyback circuit, another switchmode power supply topology may be used.

Some of the described embodiments of the subject matter and the operations can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. The data processing apparatus may include the sensor, may be part of the sensor, may be a part of a system with the sensor, may be integrated within the system and/or sensor, may be part of receivers, transmitters, components and/or logic associated with the sensor or the receivers and/or transmitters, or any combination thereof. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

Various apparatuses, devices, and machines for processing data, may be used as a "data processing apparatus," including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. A human finger, for example, can interact with a touch screen to impact an amount of screen real estate. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be useful. What is claimed is:

What is claimed is:

1. A method for detecting touch and disambiguating touch data using a capacitive touch sensor system, the capacitive touch sensor system including: a capacitive touch sensor having a two-dimensional matrix of conductors configured as a first array of conductors arranged in rows and a second array of conductors arranged in columns, a first user device that is associated with a first user and that includes first active components and a first electrode configured to both transmit and receive signals, and a second user device that is associated with a second user and that includes second active components and a second electrode configured to both transmit and receive signals, the method comprising:

receiving at least one first signal in the first user device from one or more columns in the matrix;

measuring a signal strength of the at least one first signal received by the first user device;

using the measured first signal strengths to generate column touch data for the first user, the first user column touch data indicating one or more columns in the matrix that are touched by the first user;

transmitting the first user column touch data;

transmitting a second signal from the first electrode of the first user device to one or more rows in the matrix, wherein the capacitive touch sensor is configured to generate row touch data for the first user based on the received second signal, the first user row touch data indicating one or more rows in the matrix that are touched by the first user, the first electrode being located within the first user device and being configured to electrostatically couple with the capacitive touch sensor through a body of the first user;

receiving at least one third signal in the second user device from one or more of the columns in the matrix;

measuring a signal strength of the at least one third signal received by the second user device;

using the measured third signal strengths to generate column touch data for the second user, the second user column touch data indicating one or more columns in the matrix that are touched by the second user;

transmitting the second user column touch data;

transmitting a fourth signal from the second electrode of the second user device to one or more rows in the matrix, wherein the capacitive touch sensor is configured to generate row touch data for the second user based on the received fourth signal, the second user row touch data indicating one or more rows in the matrix that are touched by the second user, the second electrode being located within the second user device and being configured to electrostatically couple with the capacitive touch sensor through a body of the second user;

receiving fifth signals in the rows of the matrix from the columns of the matrix;

measuring a signal strength of each fifth signal received by the rows from the columns;

using the measured fifth signal strengths to generate touch point location data that indicate two-dimensional locations of multiple touch points on the matrix, the touch point location data indicating the two-dimensional location of each of the multiple touch points at which a row of the matrix intersects a column of the matrix;

identifying at least one touch point of the multiple touch points as corresponding to a touch made by the first user by applying the generated touch point location data to the generated first user row touch data, the generated first user column touch data, the generated second user row touch data and the generated second user column touch data; and transmitting the identification.

2. The method of claim 1, wherein receiving the at least one first signal in the first user device comprises receiving the at least one first signal at the first electrode of the first user device through the body of the first user when the first user is touching the matrix with at least one finger, and wherein the column touch data for the first user indicates columns touched by the at least one finger of the first user.

3. The method of claim 1, wherein transmitting the at least one second signal from the first electrode of the first user device comprises transmitting the at least one second signal through the body of the first user when the first user is touching the matrix with at least one finger, and wherein the row touch data for the first user indicates rows touched by the at least one finger of the first user.

4. The method of claim 1, wherein receiving the at least one first signal in the first user device comprises receiving the at least one first signal in a portable device configured to be physically carried by the first user.

5. The method of claim 4, wherein receiving the at least one first signal in the first user device comprises receiving the at least one first signal in a coat that includes an outer lining of conductive material that acts as a grounding plate and an inner lining of conductive material that acts as the first electrode.

6. The method of claim 4, wherein receiving the at least one first signal in the first user device comprises receiving the at least one first signal in a shoe that includes an inner plate configured to contact a foot of the first user, the inner plate acting as the first electrode, and also includes an outer plate configured to couple to a floor on which the first user is standing, the outer plate acting as a grounding plate.

7. The method of claim 1,
wherein receiving the at least one first signal in the first user device comprises receiving the at least one first signal in a wireless device, and
wherein transmitting the column touch data for the first user comprises wirelessly transmitting the column touch data for the first user to a remote computer.

8. The method of claim 1,
wherein receiving the at least one first signal in the first user device comprises receiving the at least one first signal in a wired device, and
wherein transmitting the first user column touch data comprises transmitting the first user column touch data to a remote computer over a wire.

9. The method of claim 1,
wherein the capacitive touch sensor includes a controller circuit, and
wherein receiving the at least one first signal in the first user device comprises receiving the at least one first signal in a device that includes a grounding plate carried by the first user that is configured to capacitively couple to a ground of the controller circuit.

10. The method of claim 1,
wherein the capacitive touch sensor includes a controller circuit, and
wherein receiving the at least one first signal in the first user device comprises receiving the at least one first signal in a device that is configured to be directly connected to a ground of the controller circuit by a wire.

11. The method of claim 1, wherein the first active components and the second active components correspond to a same circuit.

12. The method of claim 1, wherein receiving the at least one first signal in the first user device comprises receiving the at least one first signal in a device that includes:
a switch coupled with the first electrode that is configured for multiplexing a relatively large voltage and a relatively small current, wherein the switch is configured for transmitting a voltage onto the first electrode in a transmission mode, and for receiving a current from the first electrode in a receiving mode;
a receiver circuit for the current that is coupled to the switch to receive at least part of the current through the switch, from the first electrode;
a transmitter circuit for the voltage that is coupled to the switch to transmit at least part of the voltage through the switch, onto the first electrode;
a microcontroller coupled to the receiver and the transmitter circuits; and
an internal power source to provide power to at least the microcontroller.

13. The method of claim 12, further comprising the microcontroller generating the first user column touch data and reporting at least some of the first user column touch data from the first user device.

14. The method of claim 12, wherein transmitting the first user column touch data comprises the transmitter transmitting the first user column touch data over a wireless, an ultrasonic channel or an optical channel.

15. The method of claim 12, wherein receiving the at least one first signal in the first user device comprises receiving the at least one first signal in a device that includes a battery or a supercapacitor as the internal power source.

16. The method of claim 12, wherein receiving the at least one first signal in the first user device comprises receiving the at least one first signal in the device that includes the switch coupled with the first electrode that is configured for multiplexing a voltage on the order of one hundred volts and a current on the order of one microamp.

17. A system configured to operate with a capacitive touch sensor, the capacitive touch sensor having a two-dimensional matrix of conductors configured as a first array of conductors arranged in rows and a second array of conductors arranged in columns, the system comprising:
a first user device that is associated with a first user and that includes first active components and a first electrode configured to both transmit and receive signals, the first user device being configured to:
receive at least one first signal in the first user device from one or more columns in the matrix,
measure a signal strength of the at least one first signal received by the first user device,
use the measured first signal strengths to generate column touch data for the first user, the first user column touch data indicating one or more columns in the matrix that are touched by the first user,
transmit the first user column touch data, and
transmit a second signal from the first electrode of the first user device to one or more rows in the matrix, wherein the capacitive touch sensor is configured to generate row touch data for the first user based on the received second signal, the first user row touch data indicating one or more rows in the matrix that are touched by the first user, the first electrode being located within the first user device and being configured to electrostatically couple with the capacitive touch sensor through a body of the first user;
a second user device that is associated with a second user and that includes second active components and a second electrode configured to both transmit and receive signals, the second user device being configured to:
receive at least one third signal in the second user device from one or more of the columns in the matrix,
measure a signal strength of the at least one third signal received by the second user device,
use the measured third signal strengths to generate column touch data for the second user, the second user column touch data indicating one or more columns in the matrix that are touched by the second user,
transmit the second user column touch data,
transmit a fourth signal from the second electrode of the second user device to one or more rows in the matrix, wherein the capacitive touch sensor is configured to generate row touch data for the second user based on the received fourth signal, the second user row touch data indicating one or more rows in the matrix that are touched by the second user, the second electrode being located within the second user device and being configured to electrostatically couple with the capacitive touch sensor through a body of the second user; and
one or more processors configured to:
receive fifth signals in the rows of the matrix from the columns of the matrix;
measure a signal strength of each fifth signal received by the rows from the columns;
use the measured fifth signal strengths to generate touch point location data that indicate two-dimensional locations of multiple touch points on the matrix, the touch point location data indicating the two-dimensional location of each of the multiple touch points at which a row of the matrix intersects a column of the matrix;
identify at least one touch point of the multiple touch points as corresponding to a touch made by the first user by applying the generated touch point location data to the generated first user row touch data, the generated first user column touch data, the generated second user row touch data and the generated second user column touch data; and
transmit the identification.

18. The system of claim 17, wherein the first user device being configured to receive the at least one first signal in the first user device comprises the first user device being configured to receive the at least one first signal at the first electrode of the first user device through the body of the first user when the first user is touching the matrix with at least one finger, and wherein the column touch data for the first user indicates columns touched by the at least one finger of the first user.

19. The system of claim 17, wherein the first user device being configured to transmit the at least one second signal from the first electrode of the first user device comprises the first user device being configured to transmit the at least one second signal through the body of the first user when the first user is touching the matrix with at least one finger, and wherein the row touch data for the first user indicates rows touched by the at least one finger of the first user.

20. The system of claim 17, wherein the first user device comprises a portable device configured to be physically carried by the first user.

21. The system of claim 20,
wherein the first user device includes a grounding plate,
wherein the first user device comprises a coat,
wherein the first electrode comprises an inner lining of conductive material of the coat, and
wherein the grounding plate comprises an outer lining of conductive material of the coat.

22. The system of claim 20,
wherein the first user device includes a grounding plate,
wherein the first user device comprises a shoe;
wherein the first electrode comprises an inner plate of the shoe configured to contact a foot of the first user, and
wherein the grounding plate comprises an outer plate of the shoe configured to couple to a floor on which the first user is standing.

23. The system of claim 17, wherein the first user device comprises a wireless device and communicating the column touch data for the first user comprises wirelessly communicating the column touch data for the first user to a remote computer.

24. The system of claim 17, wherein the first user device comprises a wired device and transmitting the first user column touch data comprises transmitting the first user column touch data to a remote computer over a wire.

25. The system of claim 17,
wherein the system further includes the capacitive touch sensor,
wherein the capacitive touch sensor includes a controller circuit, and
wherein the first user device includes a grounding plate carried by the first user that is configured to capacitively couple to a ground of the controller circuit.

26. The system of claim 17,
wherein the system further includes the capacitive touch sensor,
wherein the capacitive touch sensor includes a controller circuit, and
wherein the first user device is configured to be directly connected to a ground of the controller circuit by a wire.

27. The system of claim 17, wherein the first active components and the second active components correspond to a same circuit.

28. The system of claim 17, wherein the first user device comprises:
a switch coupled with the first electrode that is configured for multiplexing a relatively large voltage and a relatively small current, wherein the switch is configured for transmitting a voltage onto the first electrode in a transmission mode, and for receiving a current from the first electrode in a receiving mode;
a receiver circuit for the current that is coupled to the switch to receive at least part of the current through the switch, from the first electrode;
a transmitter circuit for the voltage that is coupled to the switch to transmit at least part of the voltage through the switch, onto the first electrode;
a microcontroller coupled to the receiver and the transmitter circuits; and
an internal power source to provide power to at least the microcontroller.

29. The system of claim 28, wherein the microcontroller is configured to:
generate the first user column touch data, and
report at least some of the first user column touch data from the first user device.

30. The system of claim 28, wherein the first user device further comprises a communication channel, wherein the communication channel comprises a wireless channel, an ultrasonic channel, or an optical channel.

31. The system of claim 28, wherein the internal power source comprises a battery or a supercapacitor.

32. The method of claim 28, wherein the current is on the order of one microamp, and wherein the voltage is on the order of one hundred volts.

* * * * *